(12) United States Patent
Uchimura et al.

(10) Patent No.: US 11,643,312 B2
(45) Date of Patent: May 9, 2023

(54) VEHICLE-MOUNTED DEVICE, CARGO HANDLING MACHINE, CONTROL CIRCUIT, CONTROL METHOD, AND PROGRAM THEREOF

(71) Applicant: NEC CORPORATION, Tokyo (JP)

(72) Inventors: Jun Uchimura, Tokyo (JP); Hideaki Takahashi, Tokyo (JP)

(73) Assignee: NEC CORORATION, Tokyo (JP)

( * ) Notice: Subject to any disclaimer, the term of this patent is extended or adjusted under 35 U.S.C. 154(b) by 758 days.

(21) Appl. No.: 16/494,991

(22) PCT Filed: Feb. 27, 2018

(86) PCT No.: PCT/JP2018/007258
§ 371 (c)(1),
(2) Date: Sep. 17, 2019

(87) PCT Pub. No.: WO2018/173651
PCT Pub. Date: Sep. 27, 2018

(65) Prior Publication Data
US 2020/0031645 A1    Jan. 30, 2020

(30) Foreign Application Priority Data

Mar. 22, 2017    (JP) .............................. JP2017-056013

(51) Int. Cl.
*B66F 9/24*    (2006.01)
*B66F 9/075*    (2006.01)
(Continued)

(52) U.S. Cl.
CPC .............. *B66F 9/24* (2013.01); *B66F 9/0755* (2013.01); *B66F 9/082* (2013.01); *B66F 17/003* (2013.01);
(Continued)

(58) Field of Classification Search
CPC ...... B60L 2200/42; B66F 9/24; B66F 9/0755; B66F 9/082; B66F 17/003; G05D 2201/0216
See application file for complete search history.

(56) References Cited

U.S. PATENT DOCUMENTS

2004/0083025 A1\* 4/2004 Yamanouchi ......... B66F 9/0755
700/213
2018/0155169 A1\* 6/2018 Tanaka ................. G05D 1/0225

FOREIGN PATENT DOCUMENTS

JP      55-46440 U     3/1980
JP      60-202098 A   10/1985
(Continued)

OTHER PUBLICATIONS

JP2017019595A translate.\*
(Continued)

*Primary Examiner* — Tyler J Lee
*Assistant Examiner* — Yufeng Zhang
(74) *Attorney, Agent, or Firm* — Sughrue Mion, PLLC

(57) ABSTRACT

A vehicle-mounted device includes an analysis unit and a control unit. The analysis unit detects an insertion target into which an insertion blade can be inserted, on the basis of sensing information acquired from a spatial recognition device. The control unit performs a loading misalignment determination to determine whether or not the insertion target loaded on a conveyance destination is misaligned from the conveyance destination on the basis of the sensing information.

13 Claims, 13 Drawing Sheets

(51) Int. Cl.
*B66F 9/08* (2006.01)
*B66F 17/00* (2006.01)
(52) U.S. Cl.
CPC .. *B60L 2200/42* (2013.01); *G05D 2201/0216* (2013.01)

(56) References Cited

FOREIGN PATENT DOCUMENTS

| JP | 63-180700 A | 7/1988 |
| JP | 11-116199 A | 4/1999 |
| JP | 2005-343654 A | 12/2005 |
| JP | 2013-230903 A | 11/2013 |
| JP | 2015-225450 A | 12/2015 |
| JP | 2016210586 A | 12/2016 |
| JP | 2017-019595 A | 1/2017 |

OTHER PUBLICATIONS

JPH11116199A translate.*
Communication dated Aug. 4, 2020, from the Japanese Patent Office in application No. 2017-056013, Machine translation.
Notice of Reasons for Refusal dated Oct. 20, 2020 from the Japanese Patent Office in Application No. 2017-056013, Machine Translation.
International Search Report of PCT/JP2018/007258 dated Apr. 24, 2018 [PCT/ISA/210], English Translation.

* cited by examiner

VEHICLE-MOUNTED DEVICE, CARGO HANDLING MACHINE, CONTROL CIRCUIT, CONTROL METHOD, AND PROGRAM THEREOF

CROSS REFERENCE TO RELATED APPLICATIONS

This application is a National Stage of International Application No. PCT/JP2018/007258, filed Feb. 27, 2018, claiming priority to Japanese Patent Application No. 2017-056013, filed Mar. 22, 2017, the contents of all of which are incorporated herein by reference in their entirety.

TECHNICAL FIELD

The present invention relates to a vehicle-mounted device, a cargo handling machine, a control circuit, a control method, and a program thereof.

BACKGROUND ART

In recent years, with the development of automatic driving technology and robot technology, the accuracy of spatial recognition technology utilizing a laser or a radar has been improved, and the price of spatial recognition sensors has reduced.

On the other hand, a device that manages cargo handling work is used in a cargo handling machine such as a forklift. For example, Patent Document 1 describes providing a cargo sensor that detects a displacement near a height position corresponding to an upper end of a mast and rapidly detecting a misalignment of the cargo even when the cargo at the upper end collides with a ceiling portion or a side wall portion of a container or truck in a case in which the cargo is transported in a state in which the cargo is loaded in a plurality of stages on forks.

DOCUMENTS OF THE PRIOR ART

Patent Document

[Patent Document 1] Japanese Unexamined Patent Application, First Publication No. S63-180700

SUMMARY OF INVENTION

Problems to be Solved by the Invention

However, a technology described in Patent Document 1 is a technology for detecting a displacement of cargo loaded on a forklift. A displacement of cargo (a transport target) loaded on a conveyance destination (for example, the bed of a transport vehicle, the stored container) other than the forklift cannot be detected.

There is a problem that the transport target may be reversed or dropped after the transport target is loaded (including during transport in the case of a transport vehicle) in a case in which the transport target loaded on the conveyance destination is misaligned.

As described above, with the technology described in Patent Document 1, there is a problem that it is not possible to prevent the transport target from being reversed or dropped and the transport target cannot be appropriately loaded.

Therefore, an object of an aspect of the present invention is to provide a vehicle-mounted device, a cargo handling machine, a control circuit, a control method, and a program capable of appropriately loading a transport target.

Means for Solving the Problems

An aspect of the present invention has been made to solve the above-described problem, and is a vehicle-mounted device including: an analysis unit that detects an insertion target into which an insertion blade can be inserted, on the basis of sensing information acquired from a spatial recognition device; and a control unit that performs a loading misalignment determination to determine whether or not the insertion target loaded on a conveyance destination is misaligned from the conveyance destination on the basis of the sensing information.

Further, an aspect of the present invention is a cargo handling machine including the above-described vehicle-mounted device.

Further, an aspect of the present invention is a control circuit that determines whether or not an insertion target into which an insertion blade can be inserted is misaligned from a conveyance destination on which the insertion target is loaded on the basis of sensing information acquired from a spatial recognition device.

Further, an aspect of the present invention is a control method including: detecting, by an analysis unit, an insertion target into which an insertion blade can be inserted, on the basis of sensing information acquired from a spatial recognition device; and performing, by a control unit, a loading misalignment determination to determine whether or not the insertion target loaded on a conveyance destination is misaligned from the conveyance destination on the basis of the sensing information.

Further, an aspect of the present invention is a program causing a computer to: detect an insertion target into which an insertion blade can be inserted, on the basis of sensing information acquired from a spatial recognition device; and perform a loading misalignment determination to determine whether or not the insertion target loaded on a conveyance destination is misaligned from the conveyance destination on the basis of the sensing information.

Advantageous Effects of the Invention

According to the aspects of the present invention, an effect that the transport target can be appropriately loaded can be obtained.

EMBODIMENTS FOR CARRYING OUT THE INVENTION

Hereinafter, embodiments of the present invention will be described in detail with reference to the drawings.

<Transport Work>

Figure 1:
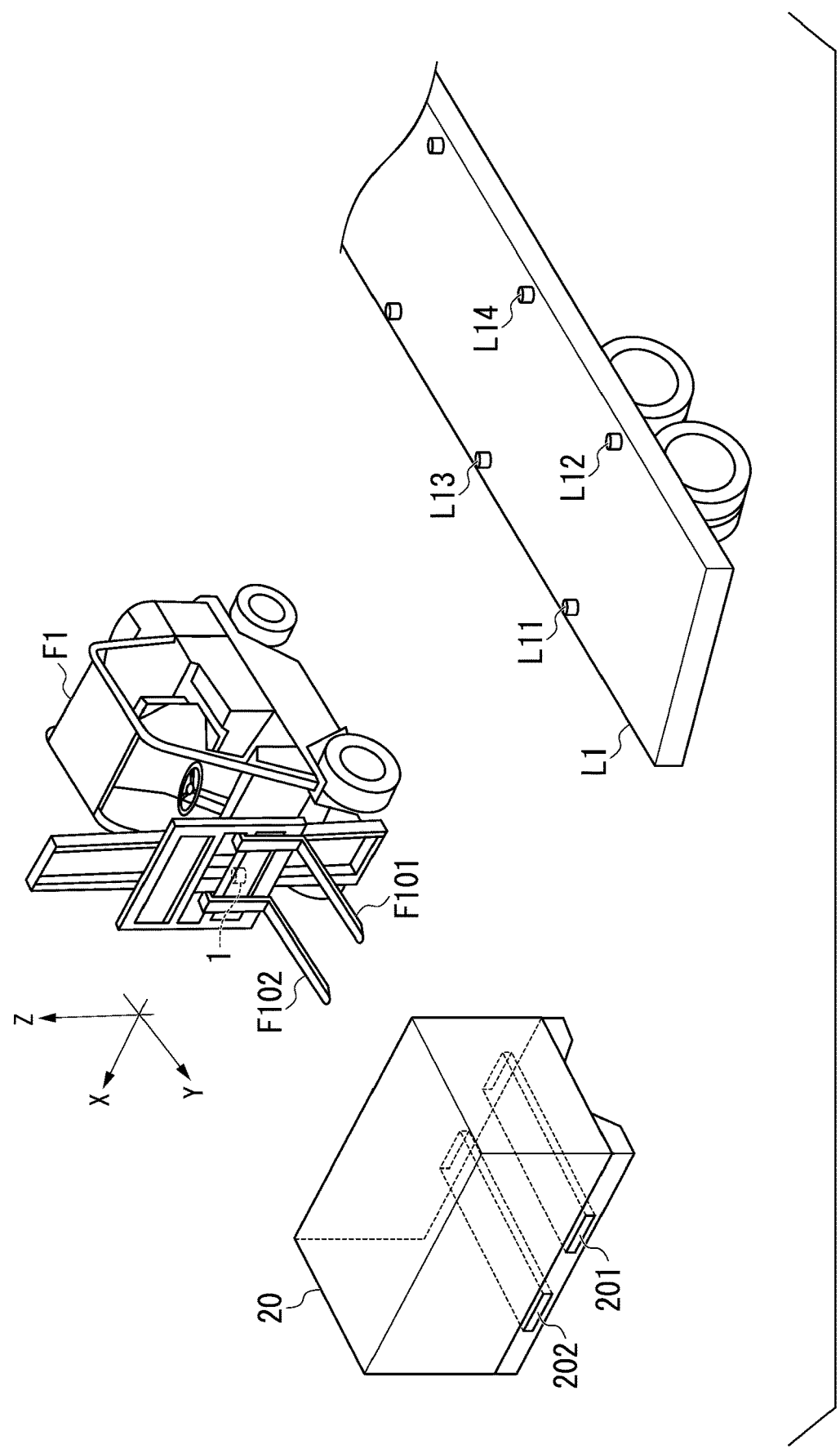
FIG. 1 is a perspective view illustrating transport work according to an embodiment of the present invention.

FIG. 1 is an illustrative diagram illustrating a transport work according to an embodiment of the present invention. A forklift F1 is an example of a cargo handling machine. Forks F101 and F102 are provided in the forklift F1. The forks F101 and F102 are examples of insertion blades.

The forklift F1 grips and transports a transport target such as a load or a pallet by inserting the forks F101 and F102 into the transport target. That is, the insertion blade that grips the transport target by being inserted into the transport target is provided in the cargo handling machine.

A container 20 is an example of the transport target or an insertion target. The container 20 is a container for storing cargo or the like therein. Openings (insertion portions; may be concave portions) of the fork pockets 201 and 202 are provided in the container 20. The fork pockets 201 and 202 are holes or concave portions into which the forks F101 and F102 can be inserted, respectively. The fork pockets 201 and 202 are an example of insertion targets.

A surface facing the forklift F1 (also referred to as an "insertion surface 211") at the time of the insertion or the transport has the fork pockets 201 and 202. The fork pockets 201 and 202 are holes or concave portions in which the forks F101 and F102 are inserted from a front surface (an insert surface 211) to a back surface (a positive direction of a Y axis in FIG. 1) of the transport target, and that have distal end portions projecting from a back surface.

In FIG. 1, the fork pockets 201 and 202 are holes extending straight in a normal direction of the insertion surface 211 in a lower portion of the insertion surface 211.

When the forks F101 and F102 are inserted straight into the fork pockets 201 and 202, respectively, the forklift F1 can grip the container 20 appropriately (with a good balance and stability) and transport the container 20.

It should be noted that a dimension or the like of the container 20 or the fork pockets 201 and 202 is defined by a standard (for example, JIS). Further, the transport target is not limited to the container 20, may be a pallet, or may be both of the pallet and cargo placed on the pallet. Here, the pallet refers to a cargo handling platform for loading the cargo. The fork pockets are provided in the pallet. Further, there may be three or more (for example, four) fork pockets.

The loading platform L1 is an example of the conveyance destination. The conveyance destination is a destination which the container 20 is transported to and loaded on by the forklift F1. The loading platform L1 is a loading platform for a truck or a trailer, a freight car for a freight train, or the like. Tightening devices L11 to L14 are provided in the loading platform L1. The tightening device is a device that is used to connect or fix the container 20.

The container 20 is gripped and transported by the forklift F1, placed on the loading platform L1, and fixed to the loading platform L1 by the tightening devices L11 to L14.

The container 20 is gripped and transported by the forklift F1, placed on the loading platform L1, and fixed to the loading platform L1 by the tightening devices L11 to L14.

It should be noted that the conveyance destination is not limited to a transport vehicle such as a freight car or a freight train, and may be another container or support, platform, or warehouses or container yard (a ground or floor).

A work management device 1 is attached and fixed to a cargo handling machine. The work management device 1 includes, for example, a spatial recognition sensor such as a laser sensor. A case in which the spatial recognition sensor is a laser sensor will be described in the embodiment. That is, the work management device 1 (a spatial recognition sensor) radiates laser light, receives reflected light, and senses a distance R from the work management device 1 to each object. The work management device 1 repeats this for a range of a sensing target. The work management device 1 recognizes a space, for example, according to an irradiation direction of the laser light and the distance R to each object (see FIGS. 3 to 6).

The work management device 1 detects the container 20 (or the insertion surface 211) on the basis of sensing information obtained from the spatial recognition sensor. The work management device 1 performs a loading misalignment determination to determine whether or not the container 20 loaded on the loading platform L1 is misaligned from the loading platform L1 (hereinafter simply referred to as "misaligned" or "not misaligned") on the basis of the sensing information. For example, the container 20 is misaligned from the loading platform L1 when the container 20 is not tightened to the tightening devices L11 to L14 to which the container 20 is to be tightened. The work management device 1 can determine whether or not the tightening devices L11 to L14 are tightened.

The work management device 1 outputs a determination result. For example, when the work management device 1 determines that the container 20 is misaligned, the work management device 1 outputs a warning (for example, a warning sound, warning light, a warning image, or guidance).

Accordingly, the work management device 1 can notify, for example, the worker or the like whether or not the container 20 is misaligned from the loading platform L1. That is, the worker or the like can reload the container 20 in response to the warning, and can load the container 20 without being shifted.

When the container 20 is misaligned, balance of the container 20 is likely to be lost or a tightening function of the tightening devices L11 to L14 is likely not to work after the container 20 is loaded (including during transport of the container 20 in the case of a transport vehicle), and the container 20 is likely to be dropped or reversed from the loading platform L1. That is, the transport target cannot be appropriately loaded.

On the other hand, since the work management device 1 determines whether or not the container 20 is misaligned, it is possible to load the transport target appropriately on the basis of a result of the determination.

It should be noted that when the container 20 is not misaligned, that is, when the container 20 is appropriately loaded, the work management device 1 may perform an output indicating the fact. Further, "loaded" means that a part or all of the container 20 has been loaded. That is, "loaded" also includes a case in which a part of the container 20 comes in contact with the loading platform L1 and the other part does not come in contact with the loading platform L1 (for example, a case in which the forks F101 and F102 are gripping the other part).

It should be noted that coordinate axes X, Y, and Z illustrated in FIG. 1 are common coordinate axes in the respective drawings of the embodiment and a modification example thereof.

<Forklift>

Figure 2:
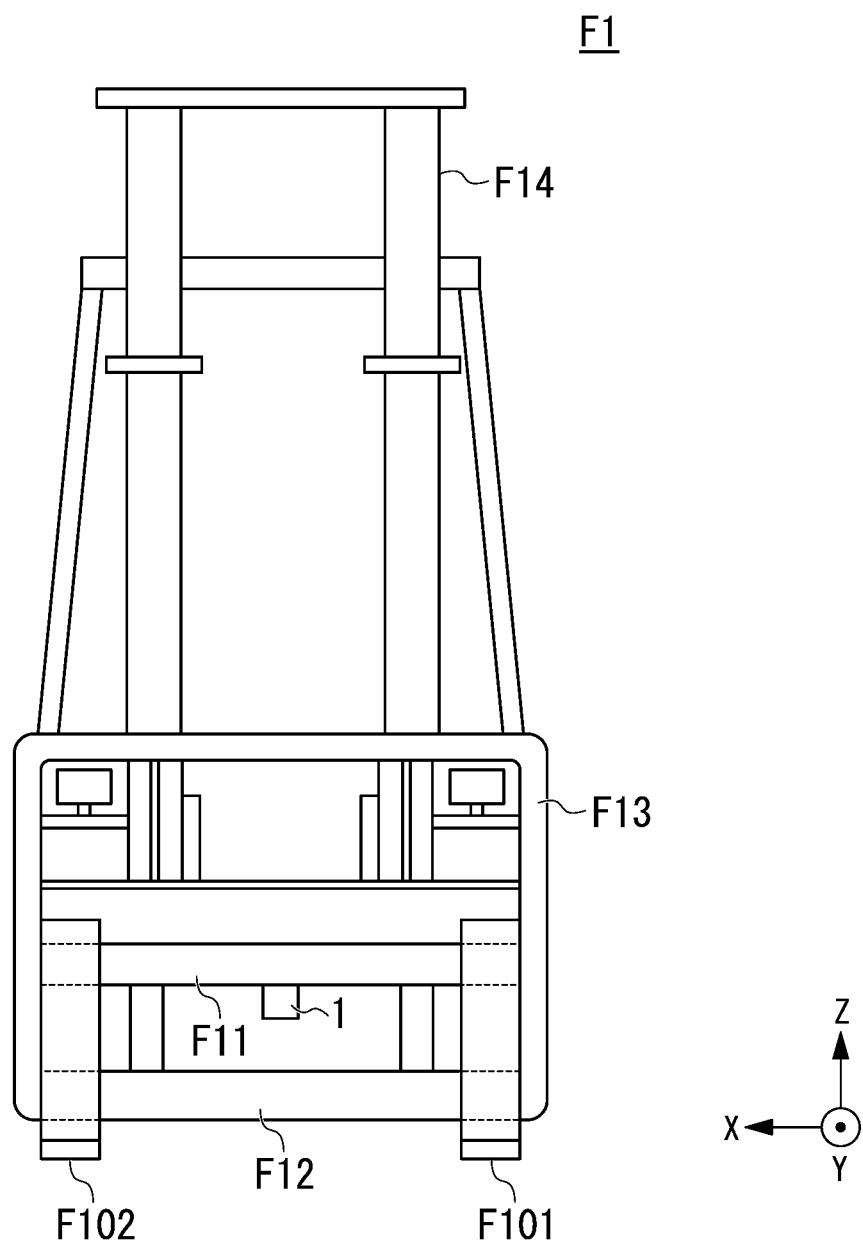
FIG. 2 is a front view illustrating an example of a fixed position of a work management device according to the embodiment.

FIG. 2 is a schematic diagram illustrating an example of a fixed position of the work management device 1 according to the embodiment.

FIG. 2 is a front view of the forklift F1.

Fork rails F11 and F12 (finger bars) are rails for attaching the forks F101 and F102. It should be noted that the fork F101 or the fork F102 are slid along the fork rails F11 and F12 such that an interval between the fork F101 and the fork F102 can be adjusted.

A backrest F13 is attached to the fork rails F11 and F12. The backrest F13 is a mechanism that prevents the gripped container 20 from collapsing or falling to the forklift F1.

A mast F14 is a rail for moving the forks F101 and F102 up and down. When the fork rails F11 and F12 are moved up and down along the mast F14, the forks F101 and F102 are moved up and down.

The work management device 1 is fixed to a central portion (in the X-axis direction) of the fork rail F11, which is the lower surface side (the lower side) of the fork rail F11. However, the work management device 1 may be attached to the top surface side (the upper side) of the fork rail F11 or the like. Further, the work management device 1 may be attached to the fork rail F12, the backrest F13, the mast F14, or a vehicle body of the forklift F1. Further, a plurality of work management devices 1 or spatial recognition sensors may be attached.

It should be noted that when the work management device 1 is fixed to the fork rail F11, the fork rail F12, and the backrest F13, the container 20 can be irradiated with the laser light without the laser light radiated by the spatial recognition device being blocked. In this case, since the fork rail F11, the fork rail F12, and the backrest F13 move up and down together with the forks F101 and F102 or the container 20, a relative positional relationship between these and the work management device 1 can be fixed.

<Sensing>

Hereinafter, sensing in the work management device 1 (a spatial recognition sensor) will be described.

It should be noted that, in the embodiment, a laser light irradiation scheme in a case in which the work management device 1 performs raster scanning will be described, but the present invention is not limited thereto and another irradiation scheme (for example, Lissajous scan) may be used.

Figure 3:
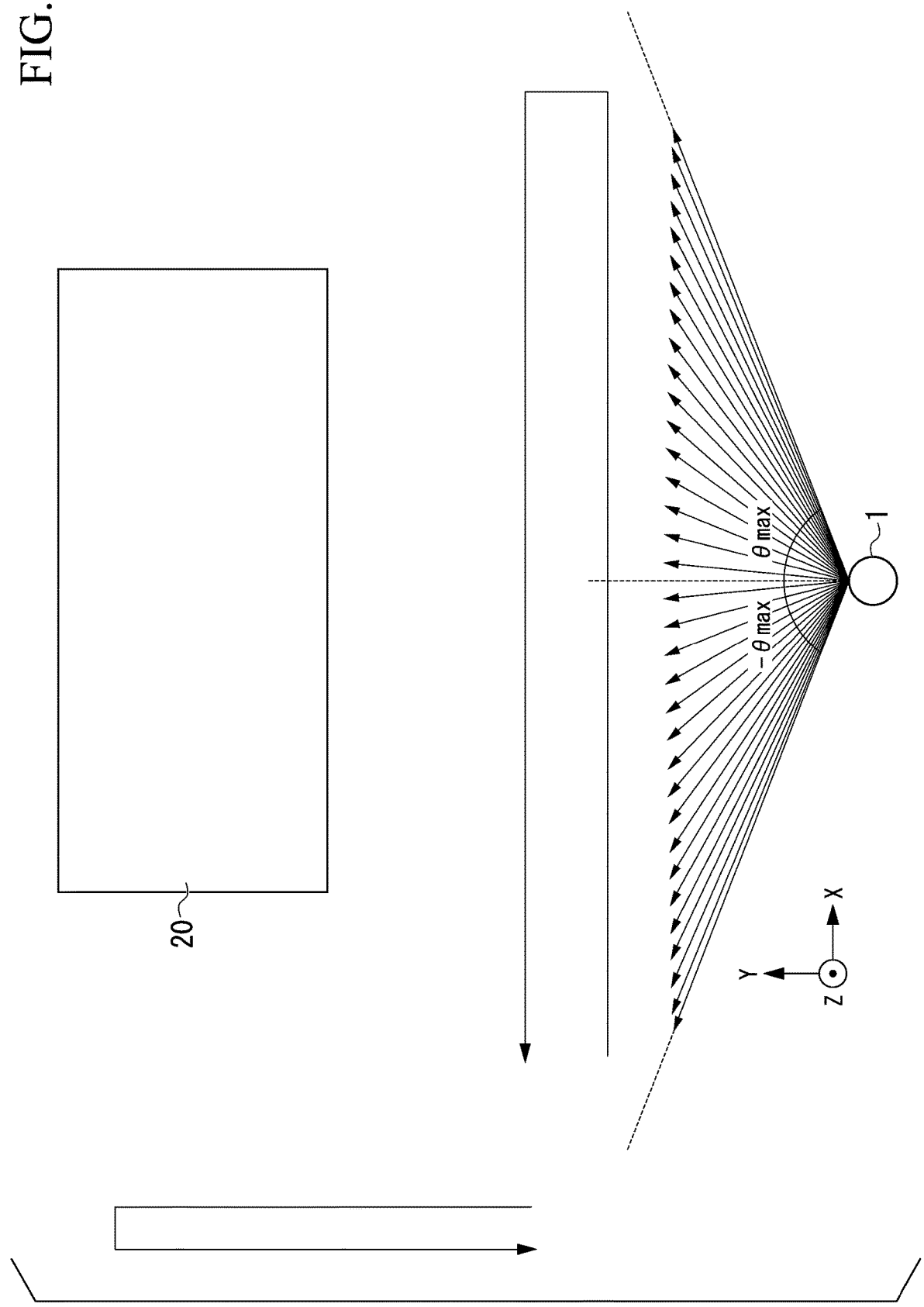
FIG. 3 is a schematic diagram illustrating an example of sensing according to the embodiment.

FIG. 3 is a schematic diagram illustrating an example of sensing according to the embodiment.

FIG. 3 is a diagram in a case in which sequentially radiated laser light is viewed from the top surface side of the forklift F1. It should be noted that, in FIG. 3, an angle (a polar angle of polar coordinates) in a case in which projection onto an XY plane is performed in a projection direction of the laser light is set to θ. An axis (an initial optical axis to be described below) that is an axis parallel to a Y axis and passing through the work management device 1 (an irradiation port) is set to θ=0.

The work management device 1 performs scanning in a horizontal direction (with other polar angles φ made constant) by sequentially radiating the laser light in the horizontal direction.

More specifically, the work management device 1 radiates the laser light sequentially (for example, at each equal angle Δθ) in a positive direction of the polar angle θ. The work management device 1 irradiates a specific range in the horizontal direction (a range in which a polar angle projected on an XY plane is −θmax≤θ≤θmax) with the laser light (also referred to as "horizontal scanning"), shifts an irradiation direction of the laser light in the vertical direction, and then, radiates the laser light in the negative direction of the polar angle θ.

When the horizontal scanning in the negative direction of the polar angle θ is completed, the work management device 1 further shifts the irradiation direction of the laser light in the vertical direction, and performs the horizontal scanning in the positive direction of the X axis again.

Figure 4:
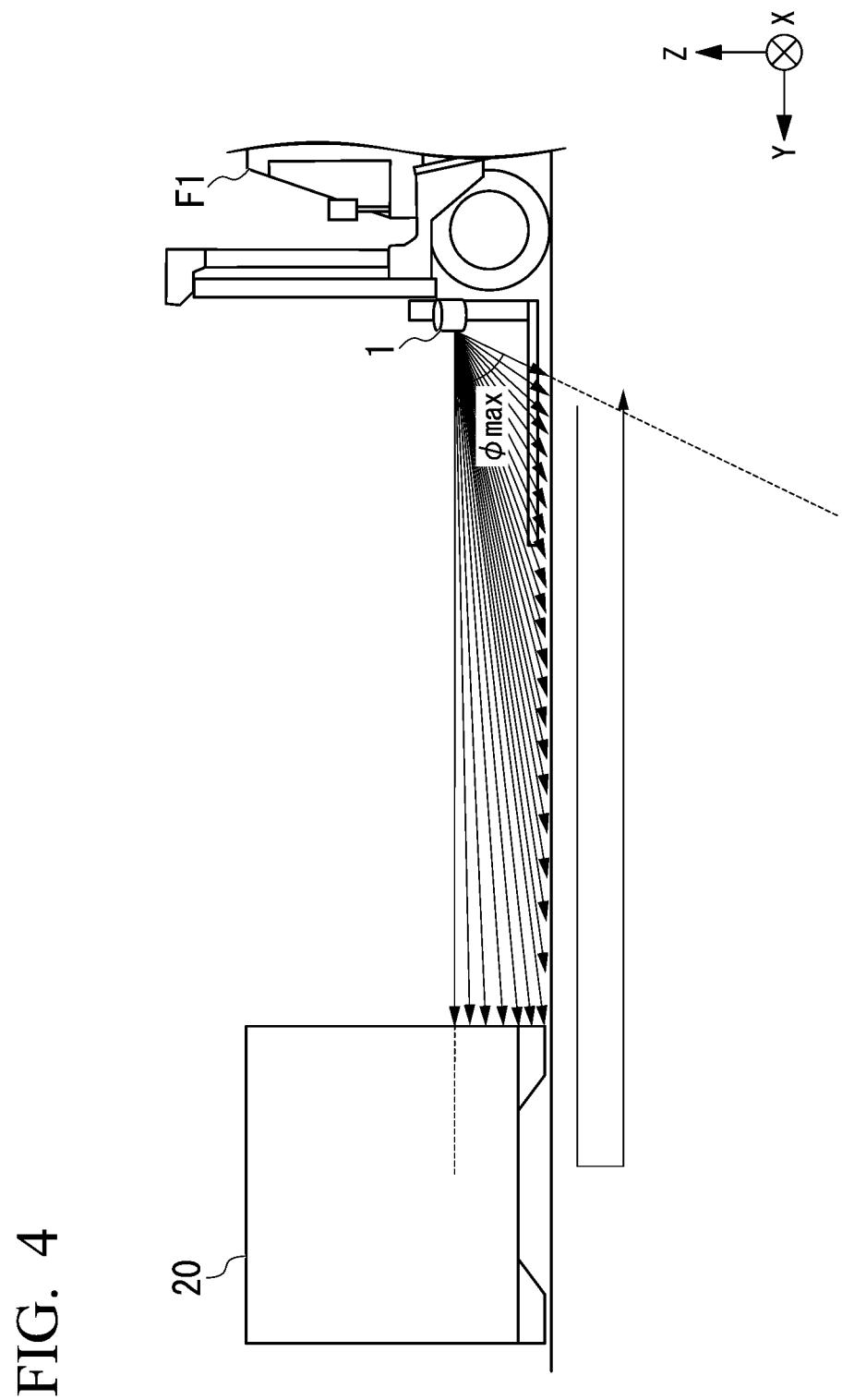
FIG. 4 is a side view illustrating an example of sensing according to the embodiment.

FIG. 4 is another schematic diagram illustrating an example of sensing according to the embodiment.

FIG. 4 is a diagram in a case in which sequentially radiated laser light is viewed from the side surface of the forklift F1. In FIG. 4, an angle (a polar angle of polar coordinates) when projection onto a YZ plane is performed in the projection direction of the laser light is set to φ. An axis (an initial optical axis) that is an axis parallel to a Y axis and passing through the work management device 1 (an irradiation port) is set to φ=0.

The work management device 1 performs scanning in the vertical direction by sequentially radiating laser light in the vertical direction (with the other polar angle θ made constant).

More specifically, the work management device 1 radiates the laser light sequentially (for example, at each equal angle Δφ) in the positive direction of the polar angle φ. The work management device 1 irradiates a specific range (a polar angle projected on the YZ plane is −φmax (for example, φmax =90°)≤φ≤0) in the vertical direction with the laser light (also referred to as "vertical scanning"), shifts the irradiation direction of the laser light in the vertical direction, and then, radiates the laser light in the negative direction of the polar angle φ.

When the vertical scanning in the negative direction of the polar angle φ is completed, the work management device 1 further shifts the irradiation direction of the laser light in the vertical direction, and performs the vertical scanning again in the positive direction of the polar angle φ.

It should be noted that the work management device 1 may perform either or both of the sensing in FIG. 3 and the sensing in FIG. 4. Further, the work management device 1 may radiate the laser light in another order or another coordinate system.

Figure 5:
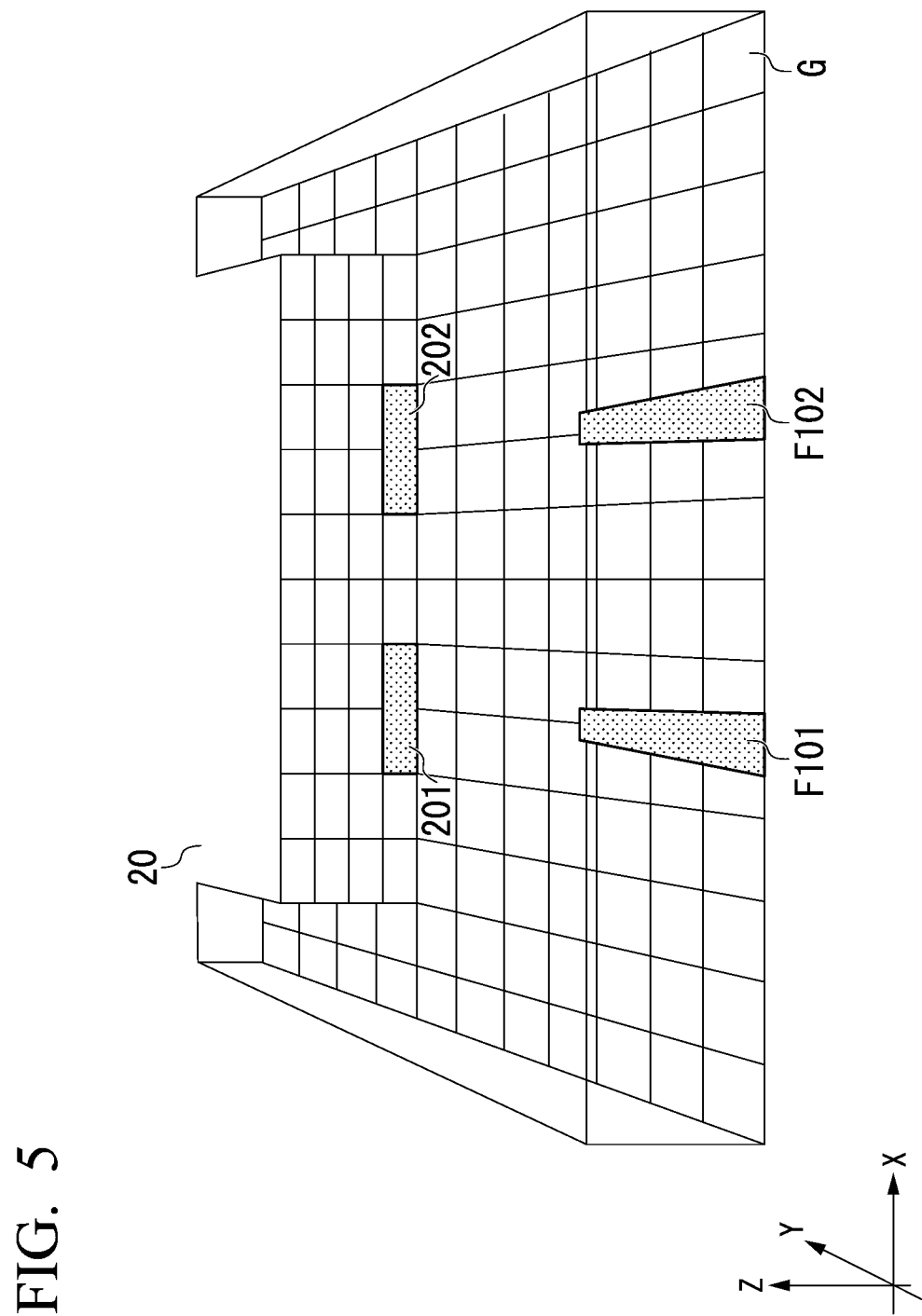
FIG. 5 is a schematic diagram illustrating an example of a sensing result according to the embodiment.

FIG. 5 is a schematic diagram illustrating an example of a sensing result according to the embodiment.

FIG. 5 illustrates sensing information indicating the sensing result in an example of the sensing in FIGS. 3 and 4. The sensing information is, for example, space coordinates. The work management device 1 calculates this space coordinate on the basis of the irradiation direction (the polar angle θ and the polar angle ϕ) of the laser light and the distance R to a reflection source (an object). The space coordinates are coordinates representing a position of the reflection source in a sensing range. FIG. 5 is a diagram schematically illustrating the space coordinates.

In FIG. 5, the work management device 1 detects the container 20, the fork pockets 201 and 202 of the container 20, and the forks F101 and F102. It should be noted that a surface denoted by reference sign G is a road surface G.

The work management device 1 detects the container 20 (at least a part of the insertion surface 211) and the fork pockets 201 and 202 of the container 20 through a first detection process. In an example of the first detection process, for example, the work management device 1 detects a flat or substantially flat surface (including a surface having unevenness) as a plane. When the work management device 1 detects the fork pockets 201 and 202 in this plane, the work management device 1 determines that the plane is the insertion surface 211 of the container 20.

Here, the work management device 1, for example, detects, as the fork pockets 201 and 202, a portion in which the reflected light of the laser light is not detected and a portion in which a reception level of the reflected light of the laser light is low in the detected plane or a lower portion of the plane.

It should be noted that the work management device 1 may detect, as the fork pockets 201 and 202, a portion in which a distance equal to or greater than a predetermined value is changed (far away) with respect to a distance to the plane in the detected plane or a lower portion of the plane.

Further, the work management device 1 may detect the fork pockets 201 and 202 from the detected plane using the sensing information and the pocket position information. Here, the pocket position information is information indicating a combination of a dimension of the container 20 and a position or dimension (shape) of the fork pockets 201 and 202 in the container 20, or information indicating a pattern of this combination. That is, for example, when there is a predetermined ratio or more of a portion in which the reception level of the reflected light of the laser light is low, at positions at which there are the fork pockets 201 and 202 on the basis of the pocket position information, the work management device 1 may determine that there are the fork pockets 201 and 202 based on the pocket position information.

The work management device 1 may detect the forks F101 and F102 through a second detection process.

In an example of the second detection process, for example, the work management device 1 detects a plane extending a specific length or more in a Y-axis direction among planes parallel or substantially parallel to the XY plane, which is a portion smaller than a specific width in the X-axis direction, as the forks F101 and F102. It should be noted that the work management device 1 may store positions and shapes of the forks F101 and F102 in advance.

<Loading Misalignment Determination (First Misalignment Determination)>

Figure 6:
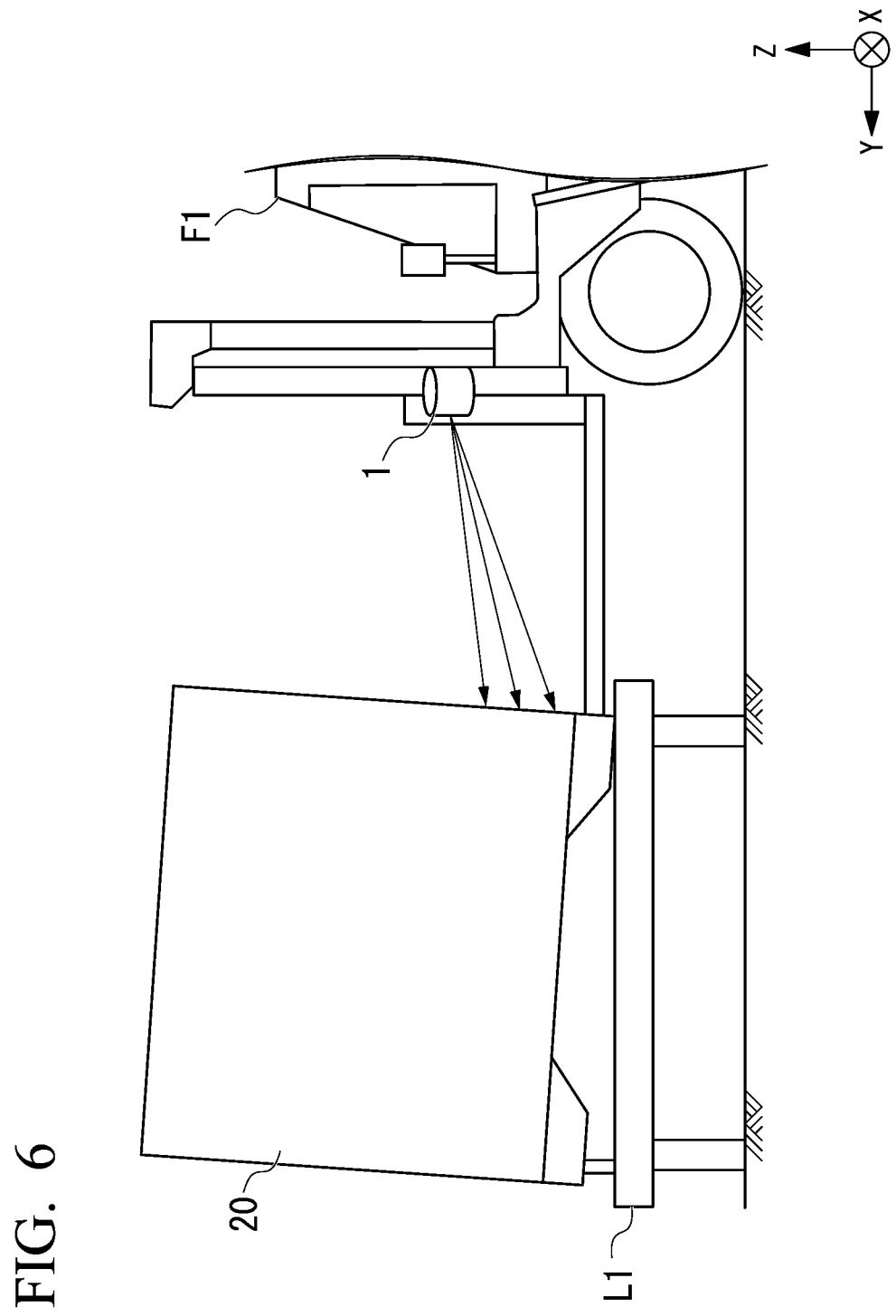
FIG. 6 is a conceptual diagram illustrating an example of a loading misalignment determination according to the embodiment

FIG. 6 is a schematic diagram illustrating an example of a loading misalignment according to the embodiment.

FIG. 6 is a diagram in a case in which the container 20 is inclined in a depth direction (to the forklift F1 side), and is a diagram when viewed from a side surface of the forklift F1.

In FIG. 6, a direction of the insertion surface 211 (or a back surface) of the container 20 is misaligned from a direction of a side surface (a surface facing the forklift F1) of the loading platform L1. A direction (or an angle) of the surfaces being "misaligned" means that the faces are not parallel or substantially parallel or that normal directions of the surfaces are not the same or substantially the same.

Further, a direction of a bottom surface (or a top surface) of the container 20 is misaligned from a direction of a top surface of the loading platform L1 (a surface on which the transport target is placed or a surface facing the transport target). It should be noted that a part of a side surface or the top surface of the loading platform L1 may be a space. For example, the top surface of the loading platform L1 (or a top surface) may be a surface including three or more points of support portions that support a load of the container 20 or a surface parallel to such a surface.

Thus, a direction of each side of the container 20 corresponds to a direction determined in the loading platform L1 in advance. For example, the work management device 1 stores a direction of the insertion surface 211 or the back surface of the container 20 in association with a direction of a side surface of the loading platform L1. The work management device 1 stores a direction of the bottom surface or the top surface of the container 20 in association with a direction of the top surface of the loading platform L1.

Further, the insertion surface 211 of the container 20 is not a vertical surface (a surface perpendicular to the horizontal surface). When the side surface of the loading platform L1 is assumed to be the vertical surface, the insertion surface 211 is misaligned from the side surface of the loading platform L1.

In the case illustrated above (in the case illustrated in FIG. 6), the work management device 1 determines that the container 20 is misaligned in the loading misalignment determination.

Figure 7A:
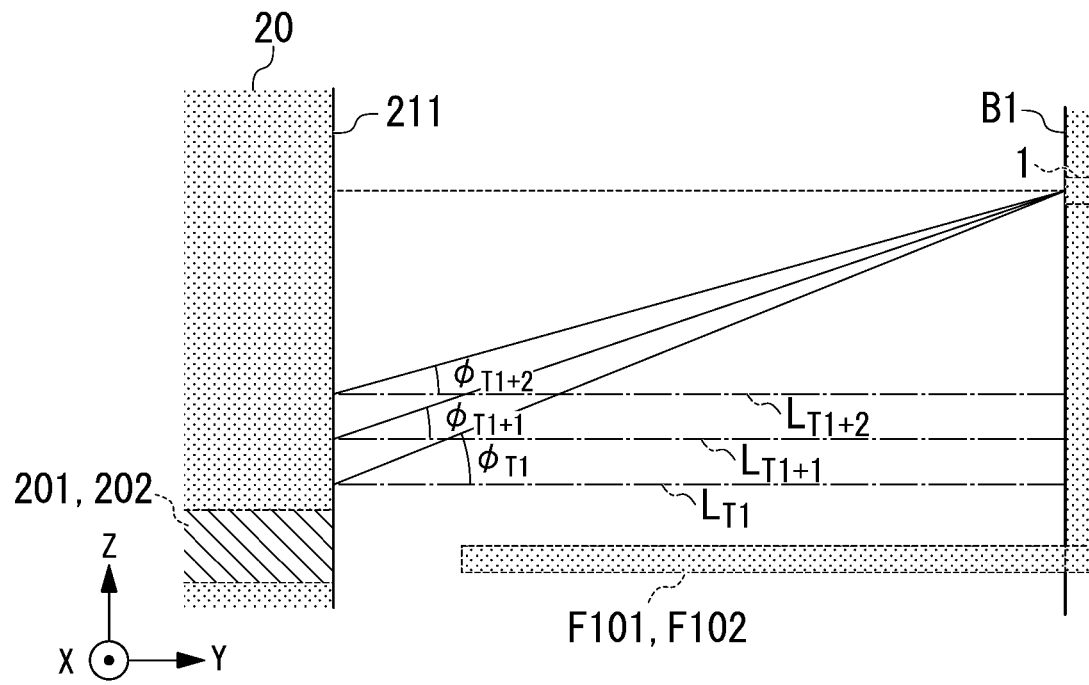
FIG. 7A is a schematic diagram illustrating an example of a loading misalignment determination according to the embodiment, and is a diagram illustrating a case in which a container is not misaligned.
Figure 7B:
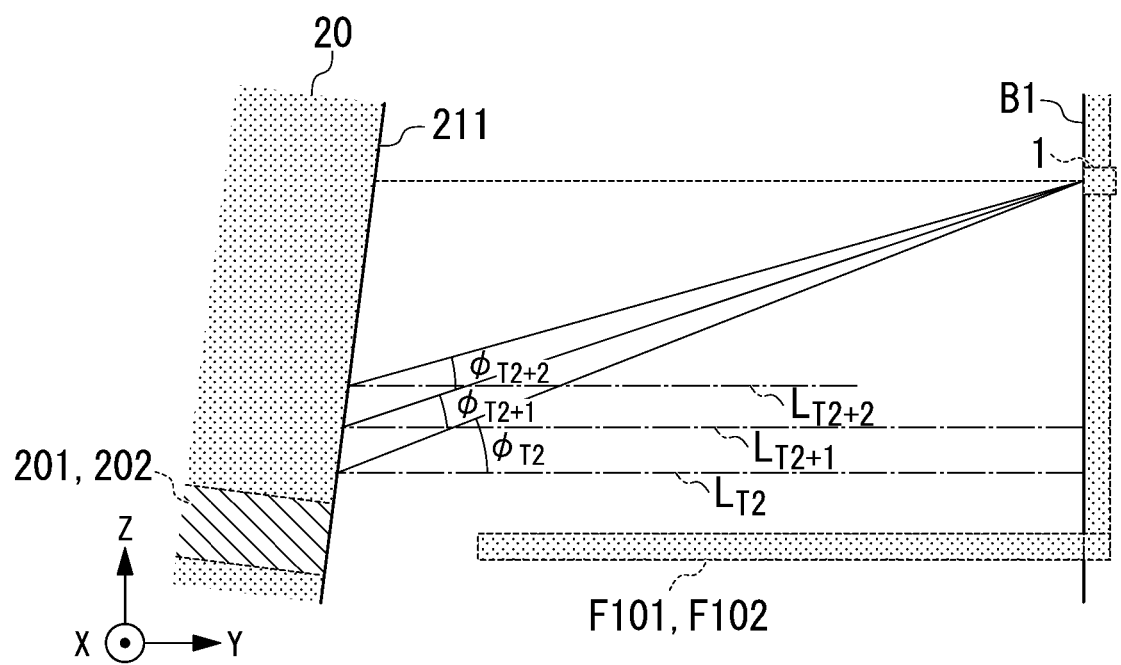
FIG. 7B is a schematic diagram illustrating an example of the loading misalignment determination according to the embodiment, and is a diagram illustrating a case in which the container is misaligned.

FIGS. 7A and 7B are schematic diagrams illustrating an example of the loading misalignment determination according to the embodiment.

FIG. 7A is a diagram in a case in which the container 20 is not misaligned. FIG. 7A is a diagram in which the sensing information described with reference to FIG. 5 is projected onto the XY plane.

FIG. 7B is a diagram in a case in which the container 20 is misaligned. FIG. 7B is a diagram in which the sensing information described with reference to FIG. 6 is projected onto the XY plane.

In FIGS. 7A and 7B, a solid line indicates laser light. Further, in FIGS. 7A and 7B, projections of the container 20 (the fork pockets 201 and 202), the forks F101 and F102, and the work management device 1 are indicated by broken lines for convenience. It should be noted that t in $\phi_t$ represents an order in which the laser light is radiated in one vertical scanning, that is, the number of irradiations. For example, in the case of vertical scanning in the positive direction, $\phi_t = \phi_{max} + t \times \Delta\phi$, and in the case of vertical scanning in the negative direction, $\phi_t = -t \times \Delta\phi$.

The work management device 1 performs a loading misalignment determination to determine whether or not the container 20 is misaligned. For example, the work management device 1 may perform the loading misalignment determination by determining whether the insertion surface 211 is parallel to a reference surface B1 (whether or not the insertion surface 211 is inclined). Here, the reference surface B1 is a plane parallel to an XZ plane and is a surface perpendicular to a traveling direction when the forklift F1 travels in a straight line. For example, the reference surface B1 is a plane including the work management device 1 (a projection port) in such a plane.

As a specific example of the loading misalignment determination, the work management device 1 calculates a distance $L_t$ (referred to as a "reference distance $L_t$") from the reference surface B1 of the forklift F1 to the insertion surface 211 on the basis of a distance $R_t$ from the work management device 1 to the object (the reflection source). Here, the distance $R_t$ represents a distance R detected through the t-th irradiation in vertical scanning, which is a distance R from the work management device 1 to the object (the reflection source).

For example, in a case in which an irradiation direction is $\phi_t$ and $\theta$, the work management device 1 calculates the reference distance $L_t = R_t \cos |\phi_t| \times \cos |\theta|$ when the work management device 1 has detected the distance $R_t$ to the object. Here, $\theta$ represents a polar angle $\theta$ when the i-th irradiation has been performed.

The work management device 1 performs the loading misalignment determination on the basis of a difference $\Delta L_{t,s} = |L_t - L_s|$ between the reference distance $L_t$ and the reference distance $L_s$ (t≠s) on the insertion surface 211. As an example, the work management device 1 performs the loading misalignment determination on the basis of a difference $\Delta L_{t+1,t} = |L_{t+1} - L_t|$ between the reference distance $L_t$ and a reference distance $L_{t+1}$ adjacent to each other.

In this case, the work management device 1 determines that the container 20 is not misaligned when all of the differences $\Delta L_{t+1,t}$ are greater than a threshold value T1 in the insertion surface 211.

On the other hand, the work management device 1 determines that the container 20 is misaligned when at least one of the differences $\Delta L_{t+1,t}$ is within the threshold value T1 in the insertion surface 211.

In FIG. 7A, $L_t$ has the same value for the insertion surface 211. In this case, for example, the difference $\Delta L_{t+1,t} = |L_{t+1} - L_t| = |L_{T1+1} - L_{T1}| = 0 = T1$. In this case, the work management device 1 determines that the container 20 is not misaligned.

In other words, the work management device 1 determines that the insertion surface 211 is a vertical surface, a normal to the insertion surface 211 is a horizontal direction, or the container 20 is not misaligned in the vertical direction. Further, the work management device 1 determines that the bottom surface or the top surface of the container 20 is horizontal with respect to the container 20 (the transport target of a rectangular parallelepiped (or a substantially rectangular parallelepiped)). Further, when the top surface of the loading platform L1 is assumed to be a horizontal surface, the work management device 1 determines that the bottom surface of the container 20 is parallel to the top surface of the loading platform L1.

In FIG. 7B, $L_t$ is a different value for the insertion surface 211. For example, $L_t$ is a monotonically decreasing function of t. In this case, for example, the difference $\Delta L_{t+1,t} = |L_{t+1} - L_t| = |L_{T2+1} - L_{T2}| > T1$. In this case, the work management device 1 determines that the container 20 is misaligned.

In other words, the work management device 1 determines that the insertion surface 211 is not a vertical surface, the normal to the insertion surface 211 is not a horizontal direction, or the container 20 is inclined in the depth direction. Further, the work management device 1 determines that the bottom surface or the top surface of the container 20 is not horizontal with respect to the container 20 (the transport target of the rectangular parallelepiped (or the substantially rectangular parallelepiped)). Further, when the top surface of the loading platform L1 is assumed to be a horizontal surface, the work management device 1 determines that the bottom surface of the container 20 is not parallel to the top surface of the loading platform L1.

<Loading Misalignment Determination (Second Loading Misalignment Determination)>

Figure 8:
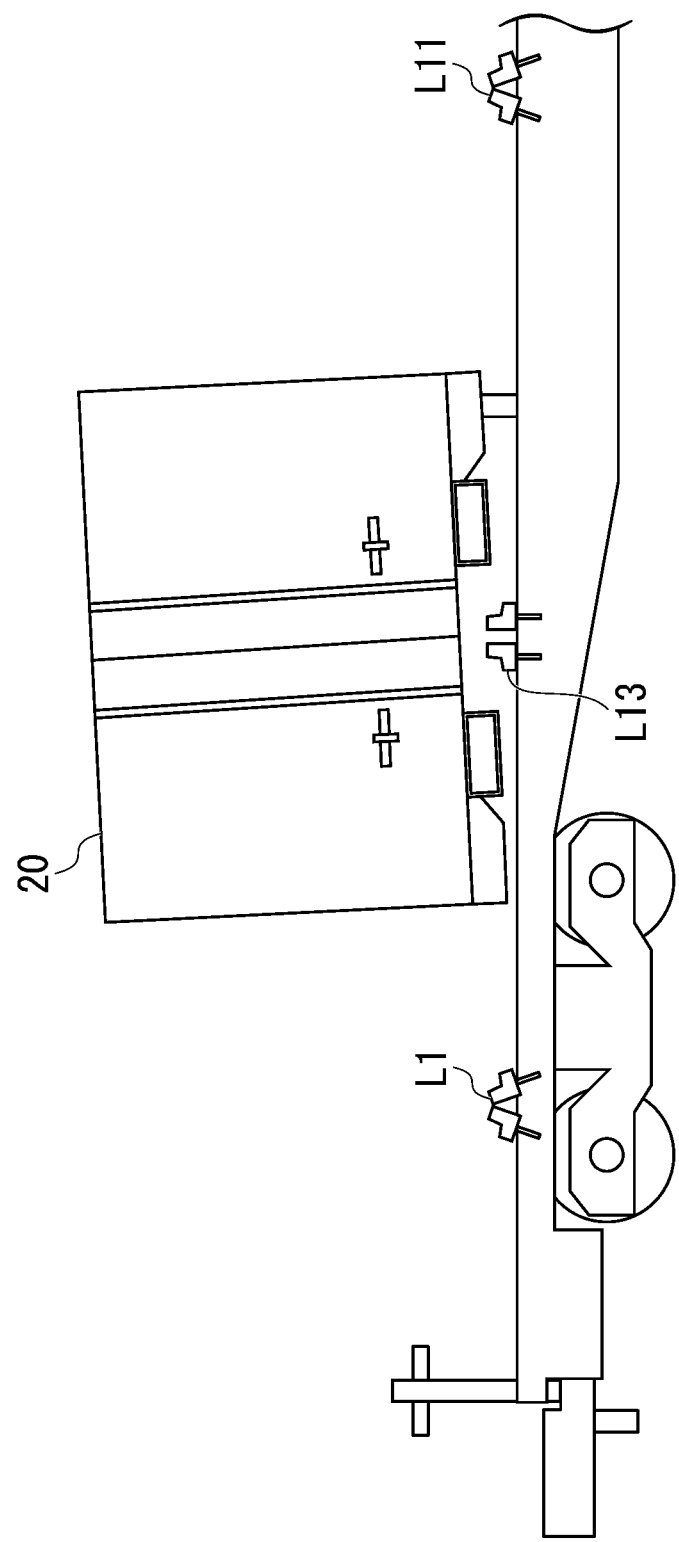
FIG. 8 is a schematic diagram illustrating another example of a loading misalignment according to the embodiment.

FIG. 8 is a schematic diagram illustrating another example of the loading misalignment according to the embodiment.

FIG. 8 is a diagram in case the container 20 is inclined in the width direction, and is a diagram when viewed from the forklift F1 side.

In FIG. 8, the direction of the bottom surface (or the top surface) of the container 20 is misaligned from the direction of the top surface of the loading platform L1.

Further, the side surface of the container 20 is not a vertical surface. When the top surface of the loading platform L1 is assumed to be a horizontal surface, the bottom surface of the container 20 is misaligned from the top surface of the loading platform L1.

In the case illustrated above (in the case illustrated in FIG. 8), the work management device 1 determines that the container 20 is misaligned in the loading misalignment determination.

Figure 9:
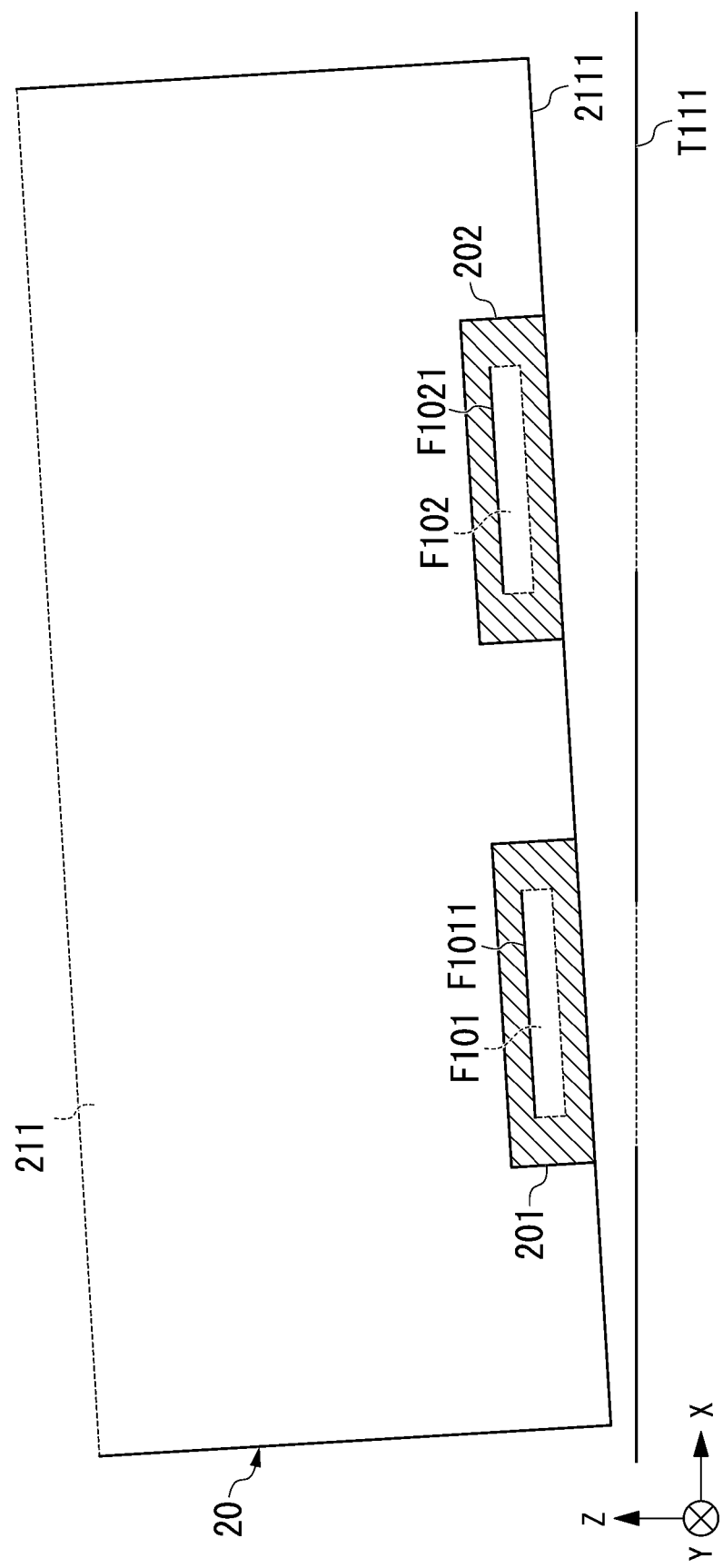
FIG. 9 is a schematic diagram illustrating another example of the loading misalignment determination according to the embodiment.

FIG. 9 is a schematic diagram illustrating another example of the loading misalignment determination according to the embodiment.

FIG. 9 is a diagram in a case in which the container 20 is misaligned. FIG. 9 is a diagram in which the sensing information detected at the time of FIG. 8 is projected onto the XZ plane. In FIG. 9, the object (the reflection source) detected by the work management device 1 is indicated by a solid line.

In FIG. 9, a straight line 2111 indicates the bottom surface of the container 20. The straight line 2111 also indicates a bottom side (or a side on the loading platform L1 side) in the insertion surface 211.

In FIG. 9, a straight line T111 indicates a top surface of the loading platform L1. The straight line T111 also indicates a side on the container 20 side in a side surface of the loading platform L1.

The work management device 1 performs edge detection on the sensing information.

As a result of the edge detection, the work management device 1 detects, for example, the straight line 2111 indicating the bottom surface of the container 20 (the bottom side of the detected insertion surface 211) and the straight line T111 indicating the top surface of the loading platform L1.

It should be noted that the work management device 1 may set a straight line that is a vertical downward direction of the straight line 2111, which is a straight line (edge) closest to the straight line 2111, as the straight line T111. Further, the work management device 1 may set a plane in the vertical downward direction of the insertion surface 211 among the detected planes as the side surface of the loading platform L1 and set a straight line on the container 20 side (vertical upper side) as the straight line T111.

Further, straight lines such as the straight line 2111 and the straight line T111 may be straight lines obtained by approximating edges. For example, the work management device 1 performs linear approximation on each point (coordinates of the object) of some of the detected edges using a least squares method or the like.

The work management device 1 performs the loading misalignment determination on the basis of the detected straight line 2111 and straight line T111. As a specific example, the work management device 1 performs the loading misalignment determination on the basis of an angle (a difference in inclination) between the detected straight lines 2111 and T111.

For example, the work management device 1 projects the straight line 2111 and the straight line T111 onto the XZ plane (the Y coordinate is ignored). The work management device 1 performs the loading misalignment determination on the basis of a difference between the inclination of the projected straight line 2111 and the inclination of the straight line T111 (also referred to as an "inclination difference").

More specifically, the work management device 1 determines that the container 20 is not misaligned when the inclination difference is equal to or smaller than a predetermined threshold value.

In other words, the work management device 1 determines that the bottom surface of the container 20 is a horizontal surface, the normal to the bottom surface of the container 20 is a vertical direction, or the container 20 is not inclined in the width direction. Further, the work management device 1 determines that the bottom surface or the top surface of the container 20 is horizontal, for the container 20. Further, when the top surface of the loading platform L1 is assumed to be the horizontal surface, the work management device 1 determines that the bottom surface of the container 20 is parallel to the top surface of the loading platform L1.

On the other hand, when the inclination difference is greater than this threshold value, the work management device 1 determines that the container 20 is misaligned.

In other words, the work management device 1 determines that the bottom surface of the container 20 is not a horizontal surface, the normal of the bottom surface of the container 20 is not a vertical direction, or the container 20 is inclined in the width direction.

Further, the work management device 1 determines that the bottom surface or the top surface of the container 20 is not horizontal for the container 20. Further, when the top surface of the loading platform L1 is assumed to be a horizontal surface, the work management device 1 determines that the bottom surface of the container 20 is not parallel to the top surface of the loading platform L1.

It should be noted that FIG. 9 is a diagram in a case in which some of forks F101 and F102 are still inserted into the container 20. For example, the line T111 indicating the top surface of the loading platform L1 is partially shown by a broken line. This is because some of the forks F101 and F102 is located between the work management device 1 and the loading platform L1, and a part of the loading platform L1 cannot be detected through sensing in the work management device 1. Thus, the work management device 1 may perform the loading misalignment determination when the forks F101 and F102 are being pulled out.

Further, when the forks F101 and F102 are completely pulled out from the container 20 and the forklift F1 moves backward by a predetermined distance, the entire line T111 is a solid line in a case in which the work management device 1 can detect the top surface of the loading platform L1. Thus, the work management device 1 may perform the loading misalignment determination after the forks F101 and F102 are completely pulled out.

<Operation of Forklift>

Figure 10:
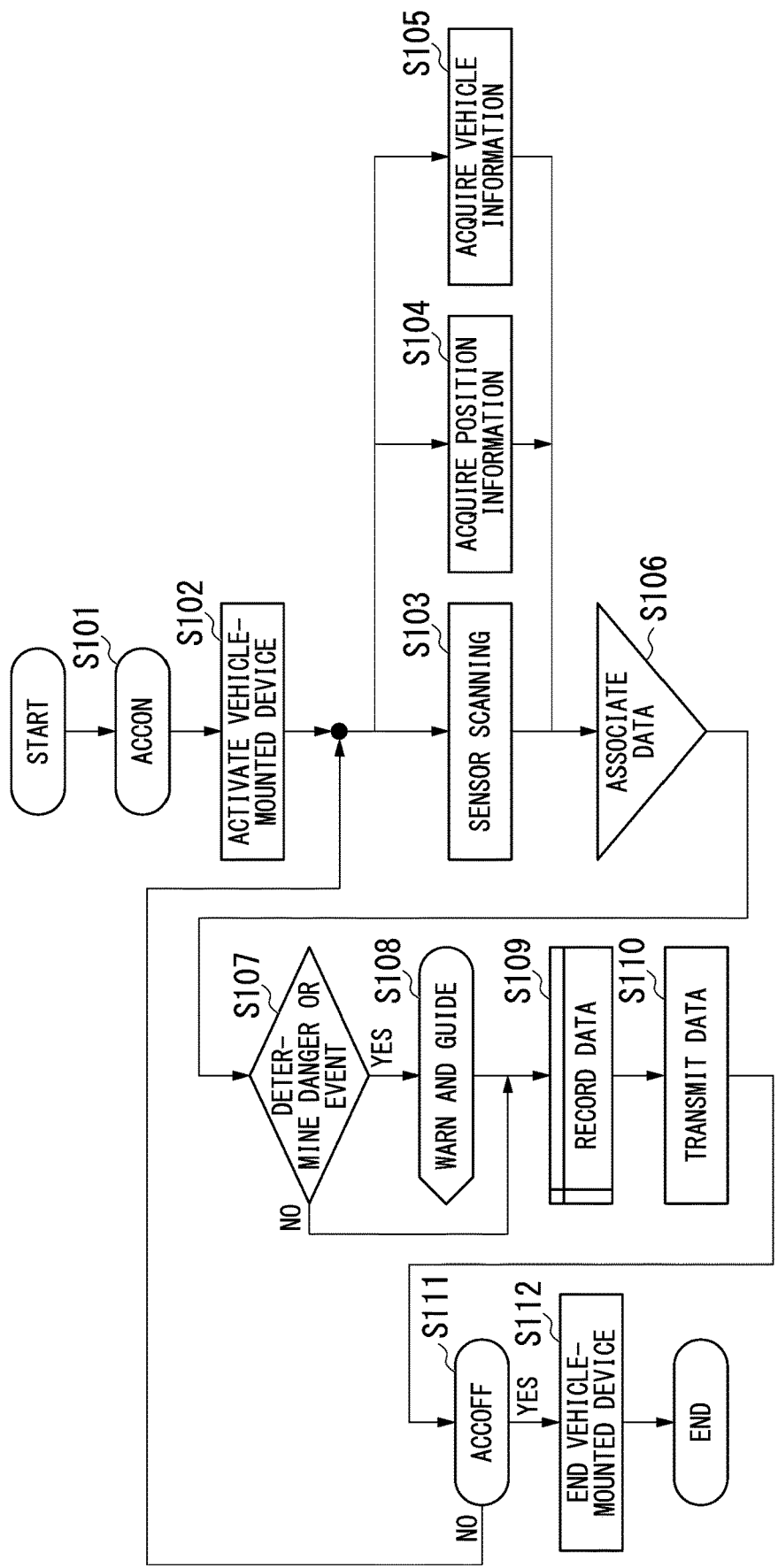
FIG. 10 is a flowchart illustrating an example of an operation of a forklift according to the embodiment.

FIG. 10 is a flowchart illustrating an example of an operation of the forklift F1 according to the embodiment.

(Step S101) The forklift F1 starts up the engine through an operation of the worker or the like (ACC ON). Thereafter, the process proceeds to step S102.

(Step S102) The vehicle-mounted device such as the work management device 1 is activated by acquiring information indicating that power is supplied or the engine is started up. Then, the process proceeds to steps S103, S104, and S105.

(Step S103) The work management device 1 acquires sensing information representing a space using the spatial recognition sensor. Specifically, the work management device 1 radiates the laser light and senses the distance to the object (sensor scan). Thereafter, the process proceeds to step S106.

(Step S104) The work management device 1 acquires position information indicating a position of the forklift F1 (the work management device 1). The position information is, for example, a positioning result of a global positioning satellite system (GNSS). However, the position information may be a positioning result using other wireless communication (for example, a wireless LAN or an RFID tag). Thereafter, the process proceeds to step S106.

(Step S105) The work management device 1 acquires vehicle information indicating a state of the forklift F1 or an operation of a worker or the like. Thereafter, the process proceeds to step S106.

Here, the vehicle information is data that the forklift F1 can output, such as a speed, steering angle, an accelerator operation, a brake operation, gears (forward, backward, high speed, low speed, or the like), manufacturer, vehicle type, or vehicle identification information of the forklift F1. Further, the vehicle information may include a position (height) of the forks F101 and F102, the presence or absence of a gripped transport target or a weight thereof, a load situation of a lift chain, fork information indicating types of the forks F101 and F102, or the like, identification information of a worker (a driver), identification information of a work place (a warehouse or a factory) or a company, or work information indicating identification information of a gripped (transported) transport target (for example, acquired by an RFID attached to the transport target, or the like).

(Step S106) The work management device 1 associates the sensing information acquired in step S103, the position information acquired in step S104, and the vehicle information acquired in step S105 (associated data is also referred to as "association data"). For example, the work management device 1 may associate the sensing information, the position information, and the vehicle information together with the device identification information of the work management device 1 and an acquisition date and time. Thereafter, the process proceeds to step S107.

(Step S107) The work management device 1 determines the presence or absence of a danger or an event on the basis of the association data associated in step S106. For example, the work management device 1 performs the above loading misalignment determination on the basis of the association data. When a determination is made that there is a danger or an event (yes), the process proceeds to step S108. On the other hand, when a determination is made that there is no danger or event (no), the process proceeds to step S109.

(Step S108) The work management device 1 outputs a warning (including guidance) on the basis of a type of danger or event determined in step S107 or data associated with the type. Thereafter, the process proceeds to step S109.

(Step S109) The work management device 1 associates the association data, determination information indicating a determination result in step S107, or output information indicating an output result of the warning in step S108 with one another, and records associated data in the recording device or the like. Thereafter, the process proceeds to step S110.

(Step S110) The work management device 1 transmits the data associated in step S109 to a server or the like. Thereafter, the process proceeds to step S111.

It should be noted that this server is, for example, an information processing device that comprehensively collects and manages data from a plurality of forklifts F1 at a work place or a company. The data transmitted to the server is analyzed using a statistical processing function or a machine learning function. The data transmitted to the server or data of an analysis result is used for driving education or the like. For example, driving data of the worker who is good at loading of the transport target or that is efficient is used as a model. On the other hand, when the transport target is damaged or dropped, data in this case is used for cause investigation or improvement.

(Step S111) When the engine of the forklift F1 is stopped due to an operation of the worker or the like (yes), the process proceeds to step S112. On the other hand, when the engine of the forklift F1 is not stopped (no), the process proceeds to steps S103, S104, and S105. That is, the work management device 1 performs the acquisition of information using sensing or the like, and the data association, recording, and transmission until the engine is stopped.

(Step S112) The vehicle-mounted device such as the work management device 1 stops or enters a sleep state by acquiring information indicating that the supply of power is stopped or the engine is stopped. Thereafter, the operation ends.

<Configuration of Work Management Device>

Figure 11:
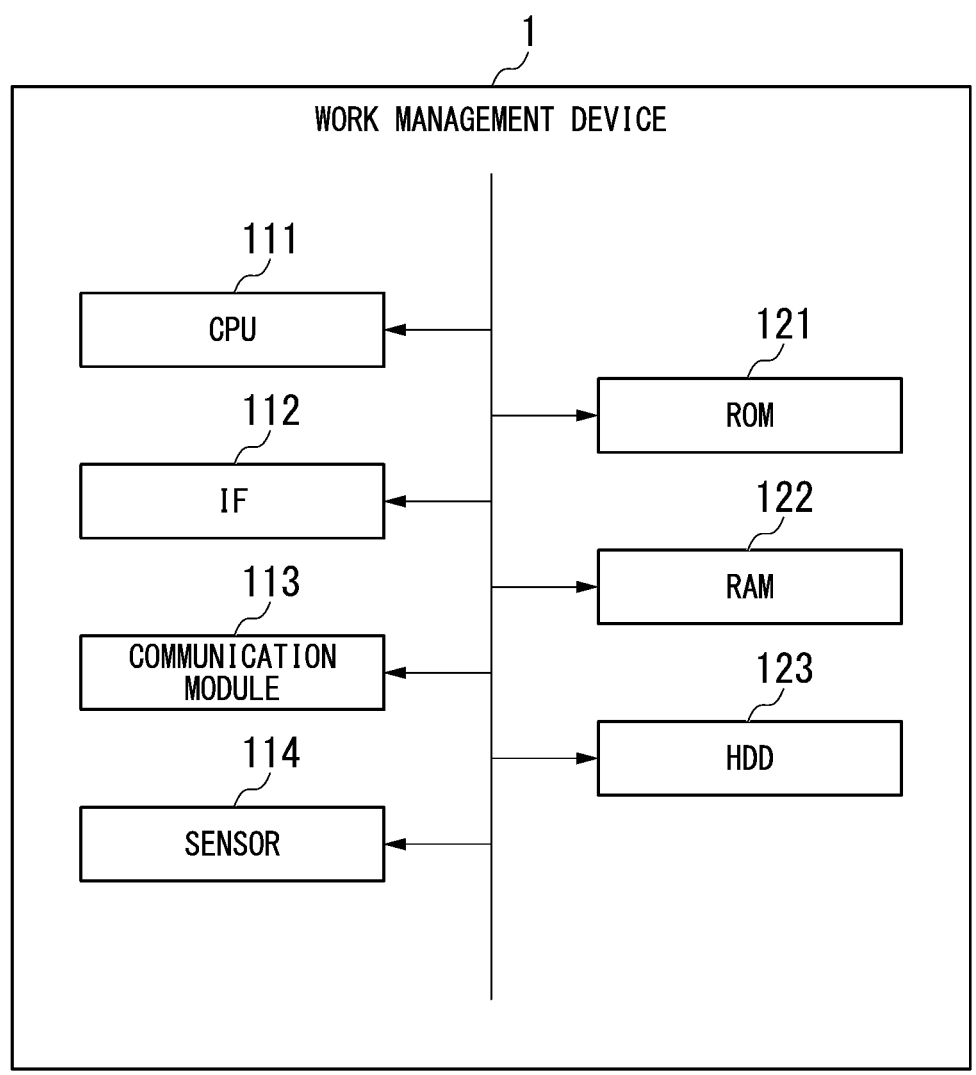
FIG. 11 is a block diagram illustrating a hardware configuration of the work management device according to the embodiment.
Figure 12:
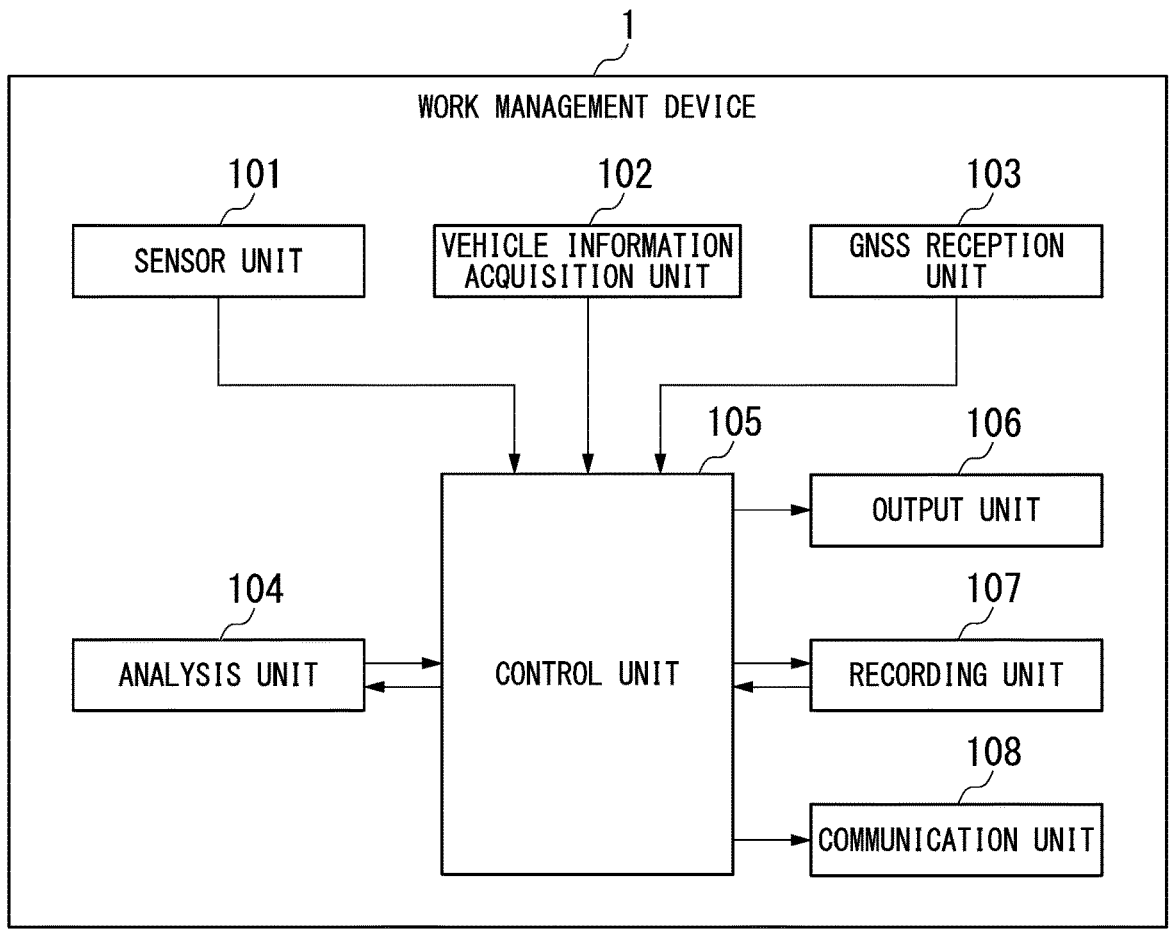
FIG. 12 is a block diagram illustrating a logical configuration of the work management device according to the embodiment.

FIG. 11 is a schematic block diagram illustrating a hardware configuration of the work management device 1 according to the embodiment. In FIG. 12, the work management device 1 includes a central processing unit (CPU) 111, an interface (IF) 112, a communication module 113, a sensor 114 (for example, a spatial recognition sensor), a read only memory (ROM) 121, a random access memory (RAM) 122, and a hard disk drive (HDD) 123.

The IF 112 is, for example, a portion (a driver's seat, a vehicle body, the mast F14, or the like) of the forklift F1 or an output device (a lamp, a speaker, a touch panel display, or the like) provided in the work management device 1. The communication module 113 performs transmission and reception of signals via a communication antenna. The communication module 113 is, for example, a communication chip such as a GNSS receiver or a wireless LAN. The sensor 114, for example, radiates laser light and performs sensing based on the received reflected light.

FIG. 12 is a schematic configuration diagram illustrating a hardware configuration of the work management device 1 according to the embodiment. In FIG. 11, the work management device 1 includes a sensor unit 101, a vehicle information acquisition unit 102, a GNSS reception unit 103, an analysis unit 104, a control unit 105, an output unit 106, a recording unit 107, and a communication unit 108.

The sensor unit 101 is a spatial recognition sensor. The sensor unit 101 senses the distance R from the own device to each object, for example, using laser light. The sensor unit 101 recognizes a space on the basis of an irradiation direction (the polar angles θ and φ) of the laser light and the sensed distance R. It should be noted that the recognition of the space means generation of three-dimensional coordinates for a space including surrounding objects, the present invention is not limited thereto and the recognition of the space ma mean generation of two-dimensional coordinates.

The sensor unit 101 generates sensing information (for example, coordinate information) and outputs the sensing information to the control unit 105.

The vehicle information acquisition unit 102 acquires vehicle information from the forklift F1 and outputs the acquired vehicle information to the control unit 105.

The GNSS reception unit 103 acquires position information and outputs the acquired position information to the control unit 105.

The analysis unit 104 acquires the sensing information output by the sensor unit 101, the vehicle information output by the vehicle information acquisition unit 102, and the position information output by the GNSS reception unit from the control unit 105.

The analysis unit 104 generates association data by associating the acquired sensing information, vehicle information, and position information with one another. The analysis unit 104 analyzes the generated association data.

For example, the analysis unit 104 detects the insertion surface 211 (the container 20) by detecting the plane and the fork pockets 201 and 202 through the first detection process based on the sensing information. Further, the analysis unit 104 detects the forks F101 and F102 through the second detection process based on the sensing information. Here, the analysis unit 104 may measure lengths of the detected forks F101 and F102.

Further, the analysis unit 104 calculates the reference distance $L_t$ and the difference $\Delta L_{t,s}$ in the vertical scanning of the detected insertion surface 211 on the basis of the acquired sensing information. Further, the analysis unit 104 performs edge detection on the acquired sensing information, and detects the straight line 2111 and the straight line T111 as a result of the edge detection (FIG. 9).

The control unit 105 acquires the sensing information output by the sensor unit 101, the vehicle information output by the vehicle information acquisition unit 102, and the position information output by the GNSS reception unit, analyzes the information using, for example, the analysis unit 104, and performs the determination on the basis of an analysis result.

For example, the control unit 105 determines the presence or absence of a danger or an event. The control unit 105 performs the above-described loading misalignment determination as one of the determinations.

Specifically, the control unit 105 performs the above-described loading misalignment determination on the basis of the difference $\Delta L_{t,s}$ calculated by the analysis unit 104. Further, the control unit 105 performs the above-described loading misalignment determination on the basis of the straight line 2111 and the straight line T111 detected by the analysis unit 104.

The control unit 105 causes a warning (including guidance) to be output from the output unit 106 on the basis of the determination result or and data associated with the determination result.

The control unit 105 records determination information indicating and data associated with the determination result on the recording unit 107, and transmits the determination information and the association data to a server or the like via the communication unit 108.

It should be noted that the sensor unit 101 is realized by the sensor 114 in FIG. 11. Similarly, the vehicle information acquisition unit 102 and the GNSS reception unit 103 are realized by the communication module 113, for example. The analysis unit 104 and the control unit 105 are realized by, for example, a CPU 111, a ROM 121, a RAM 122, or an HDD 123.

(Conclusion of Embodiment)

Figure 13:
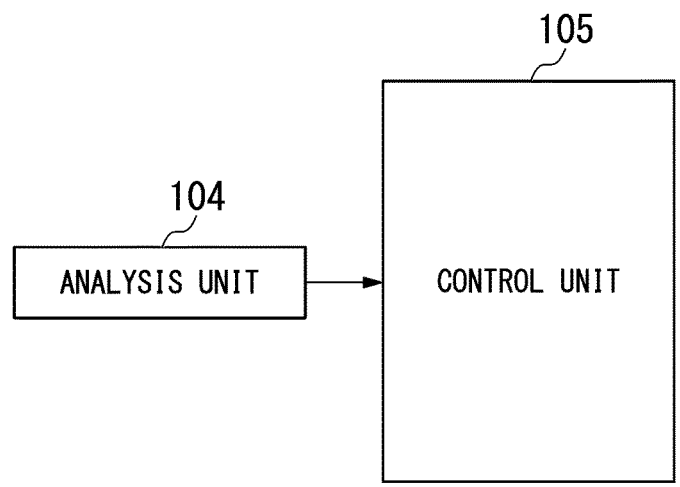
FIG. 13 is another schematic block diagram illustrating the logical configuration of the work management device according to the embodiment.

As described above, in the embodiment, the work management device 1 is a vehicle-mounted device mounted in the forklift F1 (the cargo handling machine). As illustrated in FIG. 13, the work management device 1 (the forklift F1) detects the container 20 (an insertion target) into which the forks F101 and F102 (insertion blades) can be inserted on the basis of the sensing information that the analysis unit 104 has acquired from the spatial recognition sensor (a spatial recognition device). The control unit 105 determines whether or not the container 20 loaded on the loading platform L1 (a conveyance destination) is misaligned from the loading platform L1 on the basis of the sensing information.

Accordingly, the work management device 1 can load the container 20 on the loading platform L1 without a misalignment and can load the transport target appropriately. As a result, for example, the work management device 1 can appropriately operate a tightening function of the tightening devices L11 to L14, and can prevent balance of the transport target from being lost after loading (including during transport of the transport target in the case of a transport vehicle) and the transport target from being dropped from the loading platform L1 or reversed.

Further, in the embodiment, in the work management device 1 (the forklift F1), the control unit 105 determines whether or not a direction of at least one surface of the container 20 is misaligned from a corresponding direction in the loading platform L1 as the loading misalignment determination.

For example, the control unit 105 (the ROM 121, the RAM 122, or the HDD 123) stores the direction of the insertion surface 211 or the back surface of the container 20 in association with the direction of the side surface of the loading platform L1. The control unit 105 determines whether or not the direction of the insertion surface 211 or the back surface is misaligned from the direction of the side surface of the loading platform L1 as loading misalignment determination (see FIGS. 7A and 7B). Further, for example, the control unit 105 stores the direction of the bottom surface or the top surface of the container 20 in association with the direction of the top surface of the loading platform L1. The control unit 105 determines whether or not the direction of the bottom surface or the top surface of the container 20 is misaligned from the direction of the top surface of the loading platform L1 as the loading misalignment determination.

Accordingly, the work management device 1 can eliminate the misalignment between the direction of the surface of the container 20 and the direction of the loading platform L1, and can load the container 20 on the loading platform L1 without a misalignment.

Further, in the embodiment, in the work management device 1 (the forklift F1), the analysis unit 104 detects a part or all of the insertion surface 211 having the openings of the fork pockets 201 and 202. The control unit 105 determines whether a part or all of the insertion surface 211 is a vertical surface as the loading misalignment determination.

Accordingly, the work management device 1 can determine that the container 20 inclined with respect to the vertical direction is misaligned and can detect that the container 20 is likely to be dropped or reversed. Further, the work management device 1 can determine that the container 20 not inclined with respect to the vertical direction is not misaligned and can detect that the container 20 is appropriately loaded.

Further, in the embodiment, in the work management device 1 (the forklift F1), the analysis unit 104 detects a first edge indicating a side of the container 20 and a second edge indicating a side of the loading platform L1. For example, the analysis unit 104 detects a first edge indicating the bottom surface of the container 20 and a second edge indicating the top surface of the loading platform L1. The control unit 105 performs the loading misalignment determination on the basis of the first edge and the second edge.

Accordingly, the work management device 1 can determine whether or not the container 20 is misaligned on the basis of the first edge of the container 20 and the second edge of the loading platform L1.

Further, in the embodiment, in the work management device 1 (the forklift F1), the analysis unit 104 detects the straight line 2111 indicating the direction of the first edge (an edge indicating the bottom of the container 20) and the straight line T111 indicating the direction of the second edge (an edge indicating the top surface of the loading platform L1). The control unit 105 performs the loading misalignment determination on the basis of a difference between the inclination of the straight line 2111 and the inclination of the straight line T111, for example, an angle (a difference in inclination) formed by the straight line 2111 and the straight line T111.

Accordingly, the work management device 1 can determine whether or not the container 20 is misaligned on the basis of the difference in inclination between the edges using the edge detected from the container 20 and the loading platform L1.

MODIFICATION EXAMPLE A1

In the above embodiment, the control unit 105 (the forklift F1 or the work management device 1) may perform the loading misalignment determination on the basis of the distance between the straight line 2111 and the straight line T111 in FIG. 9.

For example, the work management device 1 performs the loading misalignment determination on the basis of the distance between the straight line 2111 and the straight line T111 (also referred to as an "edge distance").

Specifically, the work management device 1 determines that the container 20 is not misaligned when the edge distance is equal to or smaller than a predetermined threshold value. On the other hand, when the edge distance is greater than this threshold value, the work management device 1 determines that the container 20 is misaligned.

It should be noted that the edge distance may be a distance between a point at which the straight line 2111 intersects with a plane parallel to the YZ plane and a point at which the straight line T111 intersects with the plane. Further, for the edge distance, a difference in distance in the respective surfaces may be calculated with respect to the point at which the straight line 2111 intersects and the point at which the straight line T111 intersects for two points on the surface parallel to the YZ plane. For the edge distance, the work management device 1 may determine that the container 20 is not misaligned when the calculated difference is equal to or smaller than a threshold value, and determine that the container 20 is misaligned when the difference is greater than the threshold value.

Thus, in this modification example, in the work management device 1 (the forklift F1), the control unit 105 performs the loading misalignment determination on the basis of the distance between the straight line 2111 and the straight line T111.

Accordingly, the work management device 1 can determine whether or not the container 20 is misaligned on the basis of the distance between the edges using the edges detected from the container 20 and the loading platform L1.

MODIFICATION EXAMPLE A2

In the above embodiment, the control unit 105 (the forklift F1 or the work management device 1) may determine whether or not the container 20 is misaligned in the angle with the loading direction (the Z-axis direction) as the rotation axis.

<Loading Misalignment Determination (Third Loading Misalignment Determination)>

Figure 14A:
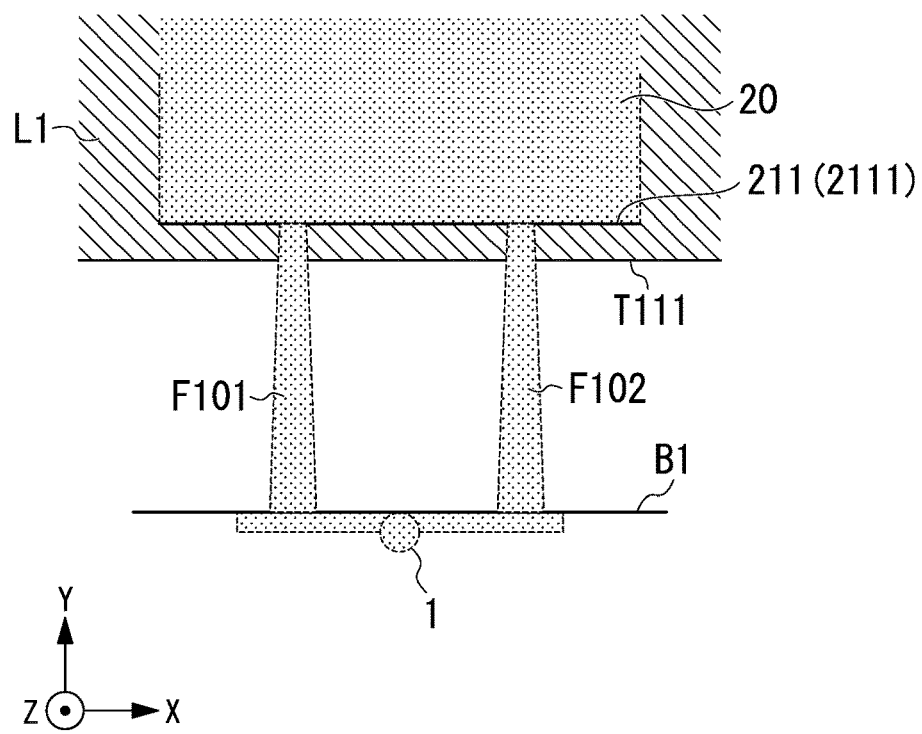
FIG. 14A is a schematic diagram illustrating an example of a loading misalignment determination according to a modification example of the embodiment, and is a diagram illustrating a case in which the container is not misaligned.
Figure 14B:
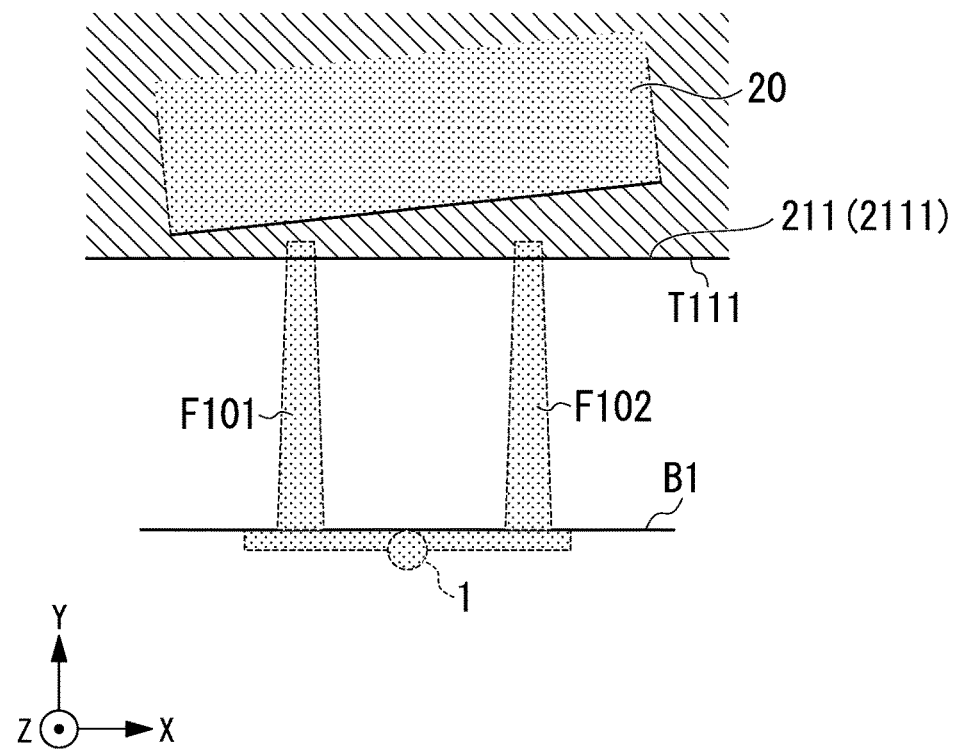
FIG. 14B is a schematic diagram illustrating an example of a loading misalignment determination according to a modification example of the embodiment, and is a diagram illustrating a case in which the container is misaligned.

FIGS. 14A and 14B are schematic diagrams illustrating an example of a loading misalignment determination according to a modification example of the embodiment.

FIG. 14A is a diagram in a case in which the container 20 is not misaligned.

FIG. 14B is a diagram in a case in which the container 20 is misaligned.

FIGS. 14A and 14B are diagrams in which detected objects (the container 20 and the loading platform L1) in the sensing information are projected onto the XY plane. It should be noted that in FIGS. 14A and 14B, projections of the container 20, the forks F101 and F102, and the work management device 1 are described by broken lines for convenience.

In FIGS. 14A and 14B, a straight line 2111 indicates a front surface (the insertion surface 211) of the container 20. A straight line 2111 indicates a bottom side (or one side on the loading platform L1 side) in the insertion surface 211. In FIGS. 14A and 14B, a straight line T111 indicates a side surface of the loading platform L1, and also indicates one side in the side surface of the loading platform L1 on the container 20 side.

The control unit 105 performs the loading misalignment determination on the basis of the straight line 2111 and the straight line T111. As a specific example, the work management device 1 performs the loading misalignment determination on the basis of the angle (a difference in a second inclination) between the straight line 2111 and the straight line T111 on the XY plane.

More specifically, the control unit 105 determines that the container 20 is not misaligned when the second inclination difference is equal to or smaller than a predetermined threshold value. On the other hand, when the second inclination difference is greater than this threshold value, the control unit 105 determines that the container 20 is misaligned.

As described above, in this modification example, in the work management device 1 (the forklift F1), the control unit 105 determines whether or not there is a misalignment in the angle with a loading direction (the Z-axis direction) as a rotation axis as the loading misalignment determination. Accordingly, the work management device 1 can load the transport target appropriately.

MODIFICATION EXAMPLE A3

In the above embodiment, the control unit 105 (the forklift F1 or the work management device 1) may perform a second loading misalignment determination after performing a third loading misalignment determination.

Even in a case in which there is no misalignment in the width direction of the container 20 when there is a misalignment in the angle with the loading direction (the Z-axis direction) as the rotation axis, the straight line 2111 and the straight line T111 in FIG. 9 may be misaligned.

In the modification example, the work management device 1 performs the third loading misalignment determination to determine whether or not there is a misalignment in the angle with the loading direction as the rotation axis. When there is no misalignment, the work management device 1 can perform an output based on the second loading misalignment determination. That is, the work management device 1 can improve the accuracy of the second loading misalignment determination.

MODIFICATION EXAMPLE B1

Condition of Output or Loading Misalignment Determination

In the above embodiment, the control unit 105 (the forklift F1 or the work management device 1) may set conditions for performing or not performing the loading misalignment determination.

The control unit 105 may perform a warning based on the loading misalignment determination when the first condition to be described below is satisfied, and may not perform the warning based on the loading misalignment determination when the first condition is not satisfied. Further, the control unit 105 may perform the loading misalignment determination or the sensing when the first condition is satisfied, and may not perform the loading misalignment determination or the sensing when the first condition is not satisfied.

Further, the control unit 105 may change an interval of a warning based on the loading misalignment determination, or the loading misalignment determination or sensing (hereinafter referred to as a warning or the like) on the basis of the first condition.

The first condition is, for example, a condition that the distance (for example, a reference distance $L_i$ or a target distance LB) between the container 20 and the forklift F1 is smaller than (closer to or approaches) the threshold value. Alternatively, the first condition is a condition that a distance between the container 20 and the forklift F1 is larger than (farther than, not close to) the threshold value. The first condition may be, for example, a condition based on the position information or the vehicle information. For example, when the forklift F1 enters a predetermined position (range) in a warehouse or the like, the control unit 105 may perform the warning or the like, and may not perform the warning or the like at other positions.

The first condition may be, for example, a condition based on fork information or work information.

For example, the control unit 105 may perform the warning or the like when there is no gripped transport target, and may not perform the warning or the like when there is a gripped transport target. The control unit 105 may perform the warning or the like when the position (height) of the forks F101 and F102 is higher than the threshold value, and may not perform the warning or the like when the position (height) of the forks F101 and F102 are lower than the threshold value.

Accordingly, the work management device 1 can perform the warning or the like when the container 20 is at a high position and a possibility of falling or reversing is high, or when a risk of falling or reversing is high.

For example, the control unit 105 may perform the warning or the like when a specific worker drives, and may not perform the warning or the like in other cases.

Further, in the above embodiment, the control unit 105 (the forklift F1 or the work management device 1) may determine a positional misalignment between the container 20 and the loading platform L1 (including the tightening devices L11 to L14). For example, the control unit 105 stores the distance between the container 20 and the loading platform L1 when these are tightened in advance. The control unit 105 determines whether or not the position is misaligned by determining whether or not the distance between the detected container 20 and the loading platform L1 and the distance between the straight line 2111 and the straight line T111 are distances stored in advance.

It should be noted that, as illustrated in FIG. 2, in a case in which the work management device 1 is fixed to a central portion of the forklift F1 in an X-axis direction, the work management device 1 can be located in a central portion of the fork F101 and the fork F102 or a central portion of the fork pocket 201 and the fork pocket 202 when the forklift F1 tries to grip the container 20 appropriately.

Further, when the work management device 1 is fixed to the fork rail F11 or the backrest F13, the work management device 1 can more easily recognize the forks F101 and F102, as compared to a case in which the work management device 1 is fixed to the fork rail F12. That is, since the work management device 1 and the forks F101 and F102 are separated in a height direction (the X-axis direction), the work management device 1 can further recognize shapes in a length direction (the Y-axis direction) of the forks F101 and F102 (see FIGS. 3 and 5).

Further, the work management device 1 can sense the forks F101 and F102 (particularly up to a root part) when the work management device 1 is fixed to the lower surface side (lower side) of the fork rail F11 or the like.

Further, when the work management device 1 is fixed to the fork rail F11 or F12, the work management device 1 can more easily recognize the fork pockets 201 and 202, as compared to a case in which the work management device 1 is fixed to the backrest F13. That is, since the work management device 1 and the fork pockets 201 and 202 approach in the height direction, the work management device 1 can cause an irradiation angle (an angle in the height direction) of the laser light or the like to the fork pockets 201 and 202 to be further close to horizontal (perpendicular to the insertion surface).

It should be noted that the spatial recognition sensor may perform spatial recognition using means other than the laser light. For example, the work management device 1 may perform spatial recognition using radio waves other than laser light, or may perform the spatial recognition using a captured image, for example. Examples of the spatial recognition sensor may include a monocular camera, a stereo camera, an infrared camera, a millimeter wave radar, an optical laser, a light detection and ranging or laser imaging detection and ranging (LiDAR), and an (ultra) sonic wave sensor.

Further, the work management device 1 may be connected to an automatic driving device or may be a portion of the automatic driving device. That is, the work management device 1 may perform the loading misalignment determination and automatically drive the forklift F1 so that the insertion amount becomes appropriate.

For example, the work management device 1 adjusts the gear, the accelerator, and the brake such that the insertion distance $d_p$ approaches a predetermined range as a result of the loading misalignment determination, for example, to move the fork lift F1 forward or backward.

Further, the work management device 1 may exclude the road surface G, a wall, and an object at a position farther than a predetermined distance from the detection targets (sensing information). When projection onto each surface is performed, the work management device 1 excludes these from projection targets.

It should be noted that the work management device 1 may use edge detection when detecting the container 20, the loading platform L1, and the forks F101 and F102. Here, an edge detected using edge detection is, for example, the distance R or a place at which a rate of change thereof is large.

As a specific edge detection, the work management device 1 may use, as an edge, a portion in which a partial differential on each coordinate axis is equal to or greater than a threshold value for the detected object. Further, for example, the work management device 1 may use, as an edge, a portion in which detected planes intersect, a portion in which a difference in distance R between adjacent or close points in the reverse direction is equal to or greater than a threshold value, or a portion adjacent to a portion in which reflected light of laser light is not detected, or a portion adjacent to a portion in which a reception level of the reflected light of the laser light is low. The work management device 1 may perform edge detection using another scheme.

It should be noted that the work management device 1 may perform the above process by recording a program for realizing each function in a computer-readable recording medium, loading the program recorded on the recording medium into the computer system, and executing the program. It should be noted that the "computer system" described herein includes an OS or hardware such as a peripheral device. Further, the "computer system" also includes a WWW system including a homepage providing environment (or display environment). Further, the "computer-readable recording medium" includes a storage device such as a flexible disk, a magneto-optical disc, a read only memory (ROM), a portable medium such as a CD-ROM, or a hard disk built in the computer system. Further, the "computer-readable recording medium" also includes a recording medium that holds a program for a certain time, such as a volatile memory (RAM) inside a computer system including a server and a client when a program is transmitted over a network such as the Internet or a communication line such as a telephone line.

Further, the program may be transmitted from a computer system in which the program is stored in a storage device or the like to other computer systems via a transfer medium or by transfer waves in the transfer medium. Here, the "transfer medium" for transferring the program refers to a medium having a function of transferring information, such as a network (communication network) such as the Internet or a communication line such as a telephone line. Further, the program may be a program for realizing some of the above-described functions. Further, the program may be a program capable of realizing the above-described functions in combination with a program previously stored in the computer system, that is, a so-called differential file (differential program).

REFERENCE SYMBOLS

F1 Forklift
F101, F102 Fork
F11, F12 Fork rail
F13 Backrest

F14 Mast
20 Container
201, 202 Fork pocket
211 Insertion surface
1 Work management device
111 CPU
112 IF
113 Communication module
114 sensor
121 ROM
122 RAM
123 HDD
101 Sensor
102 Vehicle Information acquisition Unit
103 GNSS receiver
104 Analysis unit
105 Control unit
106 Output unit
107 Recording unit
108 Communication unit

The invention claimed is:

1. A device mounted on a vehicle, the device comprising:
a spatial recognition sensor configured to generate sensing information by irradiating electromagnetic waves, the sensing information representing space coordinates of an object;
an analyzer configured to detect a shape of a transport target and a shape of a loading platform using the sensing information; and
a controller configured to determine whether or not the transport target is misaligned from the loading platform using the shape of the transport target and the shape of the loading platform,
wherein the analyzer is configured to detect a first edge indicating a side of the transport target and a second edge indicating a side of the loading platform, and
wherein the controller is configured to determine whether or not the transport target is misaligned from the loading platform using the first edge and the second edge, using a difference between an inclination of a first straight line indicating a direction of the first edge and an inclination of a second straight line indicating a direction of the second edge, and using an angle between the first straight line and the second straight line in a projection of a frontal plane of the vehicle.

2. The device according to claim 1, wherein the controller is configured to determine whether or not a direction of at least one side of the transport target is misaligned from a corresponding direction at the loading platform.

3. The device according to claim 1, wherein the analyzer is configured to detect a part or all of an insertion surface having an insertion portion of the transport target, and
wherein the controller is configured to determine whether a part or all of the insertion surface is a vertical surface.

4. The device of claim 1, wherein the controller is configured to determine whether or not the transport target is misaligned from the loading platform using a distance between a first straight line indicating the first edge and a second straight line indicating the second edge.

5. The device according to claim 1, wherein the analyzer is configured to detect a shape of a loading platform of a freight vehicle.

6. A cargo handling machine comprising a device mounted on a vehicle, the device including:
a spatial recognition sensor configured to generate sensing information by irradiating electromagnetic waves, the sensing information representing space coordinates of an object;
an analyzer configured to detect a shape of a transport target and a shape of a loading platform using the sensing information; and
a controller configured to determine whether or not the transport target is misaligned from the loading platform using the shape of the transport target and the shape of the loading platform,
wherein the analyzer is configured to detect a first edge indicating a side of the transport target and a second edge indicating a side of the loading platform, and
wherein the controller is configured to determine whether or not the transport target is misaligned from the loading platform using the first edge and the second edge, using a difference between an inclination of a first straight line indicating a direction of the first edge and an inclination of a second straight line indicating a direction of the second edge, and using an angle between the first straight line and the second straight line in a projection of a frontal plane of the vehicle.

7. A control method comprising:
generating, by a spatial recognition sensor, sensing information by irradiating electromagnetic waves, the sensing information representing space coordinates of an object;
detecting, by an analyzer, a shape of a transport target and a shape of a loading platform using the sensing information;
determining, by a controller, whether or not the transport target is misaligned from the loading platform using the shape of the transport target and the shape of the loading platform;
detecting, by the analyzer, a first edge indicating a side of the transport target and a second edge indicating a side of the loading platform; and
determining, by the controller, whether or not the transport target is misaligned from the loading platform using the first edge and the second edge, using a difference between an inclination of a first straight line indicating a direction of the first edge and an inclination of a second straight line indicating a direction of the second edge, and using an angle between the first straight line and the second straight line in a projection of a frontal plane of the vehicle.

8. A non-transitory computer readable medium which stores a program, which if executed, causes a computer to:
generate sensing information by irradiating electromagnetic waves, the sensing information representing space coordinates of an object;
detect a shape of a transport target and a shape of a loading platform using the sensing information;
determine whether or not the transport target is misaligned from the loading platform using the shape of the transport target and the shape of the loading platform;
detect a first edge indicating a side of the transport target and a second edge indicating a side of the loading platform; and
determine whether or not the transport target is misaligned from the loading platform using the first edge and the second edge, using a difference between an inclination of a first straight line indicating a direction of the first edge and an inclination of a second straight line indicating a direction of the second edge, and using an angle between the first straight line and the second straight line in a projection of a frontal plane of the vehicle.

9. A device mounted on a vehicle, the device comprising:
a spatial recognition sensor configured to generate sensing information by irradiating electromagnetic waves, the sensing information representing space coordinates of an object;
an analyzer configured to detect a shape of a transport target and a shape of a loading platform using the sensing information; and
a controller configured to determine whether or not the transport target is misaligned from the loading platform using the shape of the transport target and the shape of the loading platform,
wherein the analyzer is configured to detect a first edge indicating a side of the transport target and a second edge indicating a side of the loading platform, and
wherein the controller is configured to determine whether or not the transport target is misaligned from the loading platform using the first edge and the second edge, using a difference between an inclination of a first straight line indicating a direction of the first edge and an inclination of a second straight line indicating a direction of the second edge, and using an angle between the first straight line and the second straight line in a projection of a horizontal plane.

10. The device according to claim 9, wherein the controller is configured to determine whether or not a direction of at least one side of the transport target is misaligned from a corresponding direction at the loading platform.

11. The device according to claim 9, wherein the analyzer is configured to detect a part or all of an insertion surface having an insertion portion of the transport target, and
wherein the controller is configured to determine whether a part or all of the insertion surface is a vertical surface.

12. The device of claim 9, wherein the controller is configured to determine whether or not the transport target is misaligned from the loading platform using a distance between a first straight line indicating the first edge and a second straight line indicating the second edge.

13. The device according to claim 9, wherein the analyzer is configured to detect a shape of the loading platform of a freight vehicle.

* * * * *